US008340850B2

United States Patent
Muta et al.

(10) Patent No.: US 8,340,850 B2
(45) Date of Patent: Dec. 25, 2012

(54) MISLOCKING PREVENTING APPARATUS

(75) Inventors: Koichiro Muta, Okazaki (JP); Hiroyuki Ogura, Toyoake (JP); Naofumi Magarida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/255,357

(22) PCT Filed: Mar. 12, 2009

(86) PCT No.: PCT/JP2009/054761
§ 371 (c)(1),
(2), (4) Date: Sep. 8, 2011

(87) PCT Pub. No.: WO2010/103642
PCT Pub. Date: Sep. 16, 2010

(65) Prior Publication Data
US 2011/0320084 A1    Dec. 29, 2011

(51) Int. Cl.
*G06F 7/00* (2006.01)
(52) U.S. Cl. ............. 701/22; 70/186; 70/252; 70/422; 477/62; 477/174; 318/266; 318/434; 180/197
(58) Field of Classification Search .............. 701/22, 701/93.3; 70/186, 252, 422; 477/62, 174; 318/266, 434; 342/383.1; 303/113.1; 180/197
See application file for complete search history.

(56) References Cited

U.S. PATENT DOCUMENTS

| | | | |
|---|---|---|---|
| 7,108,088 B2* | 9/2006 | Muta .................. | 180/65.235 |
| 7,213,665 B2* | 5/2007 | Yamaguchi et al. ....... | 180/65.27 |
| 7,478,691 B2* | 1/2009 | Yamaguchi et al. ....... | 180/65.28 |
| 7,819,212 B2* | 10/2010 | Kawasaki ................ | 180/65.265 |
| 7,891,450 B2* | 2/2011 | Soliman et al. .......... | 180/65.265 |
| 2004/0045753 A1* | 3/2004 | Yamaguchi et al. ........ | 180/65.2 |
| 2005/0016781 A1* | 1/2005 | Muta ..................... | 180/65.2 |

(Continued)

FOREIGN PATENT DOCUMENTS
JP    A-9-109694    4/1997
(Continued)

OTHER PUBLICATIONS

International Search Report mailed Jun. 23, 2009 issued in International Patent Application No. PCT/JP2009/054761 (with translation).

*Primary Examiner* — James P Trammell
*Assistant Examiner* — McDieunel Marc
(74) *Attorney, Agent, or Firm* — Oliff & Berridge, PLC

(57) ABSTRACT

In a hybrid vehicle in which a fixed speed change mode can be realized by the locking of a rotational element, the mislocking of the rotational element is prevented. A hybrid drive apparatus which has an engine, a MG1 and a MG2 and which functions as a power unit of a hybrid vehicle is provided with a brake mechanism of a cam-lock type which can control the MG1 in a lock state and a non-lock state by changing the state of a sun gear between the lock state and the non-lock state. In mislocking prevention control, an ECU calculates MG1 angular acceleration $D\omega g$, which is the absolute value of angular acceleration of the motor generator MG1, on the basis of a MG1 rotational speed $N_{gm1}$ and judges that the sun gear S1 is in a mislocking state if the MG1 angular acceleration $D\omega g$ is greater than a criterion value $D\omega gth$.

7 Claims, 10 Drawing Sheets

U.S. PATENT DOCUMENTS

| | | |
|---|---|---|
| 2007/0111848 A1 | 5/2007 | Tabata et al. |
| 2007/0169971 A1* | 7/2007 | Yamaguchi et al. .......... 180/65.2 |
| 2009/0209382 A1* | 8/2009 | Tabata et al. ...................... 475/5 |
| 2011/0231043 A1* | 9/2011 | Ebuchi et al. ................... 701/22 |
| 2012/0028757 A1* | 2/2012 | Kimura et al. .................... 477/5 |
| 2012/0059540 A1* | 3/2012 | Ogura ............................. 701/22 |
| 2012/0095635 A1* | 4/2012 | Kanno et al. ................... 701/22 |

FOREIGN PATENT DOCUMENTS

| | | |
|---|---|---|
| JP | A-2004-345527 | 12/2004 |
| JP | A-2005-304229 | 10/2005 |
| JP | A-2006-22844 | 1/2006 |
| JP | A-2007-1451 | 1/2007 |
| JP | A-2009-29394 | 2/2009 |

* cited by examiner (a)

(b)

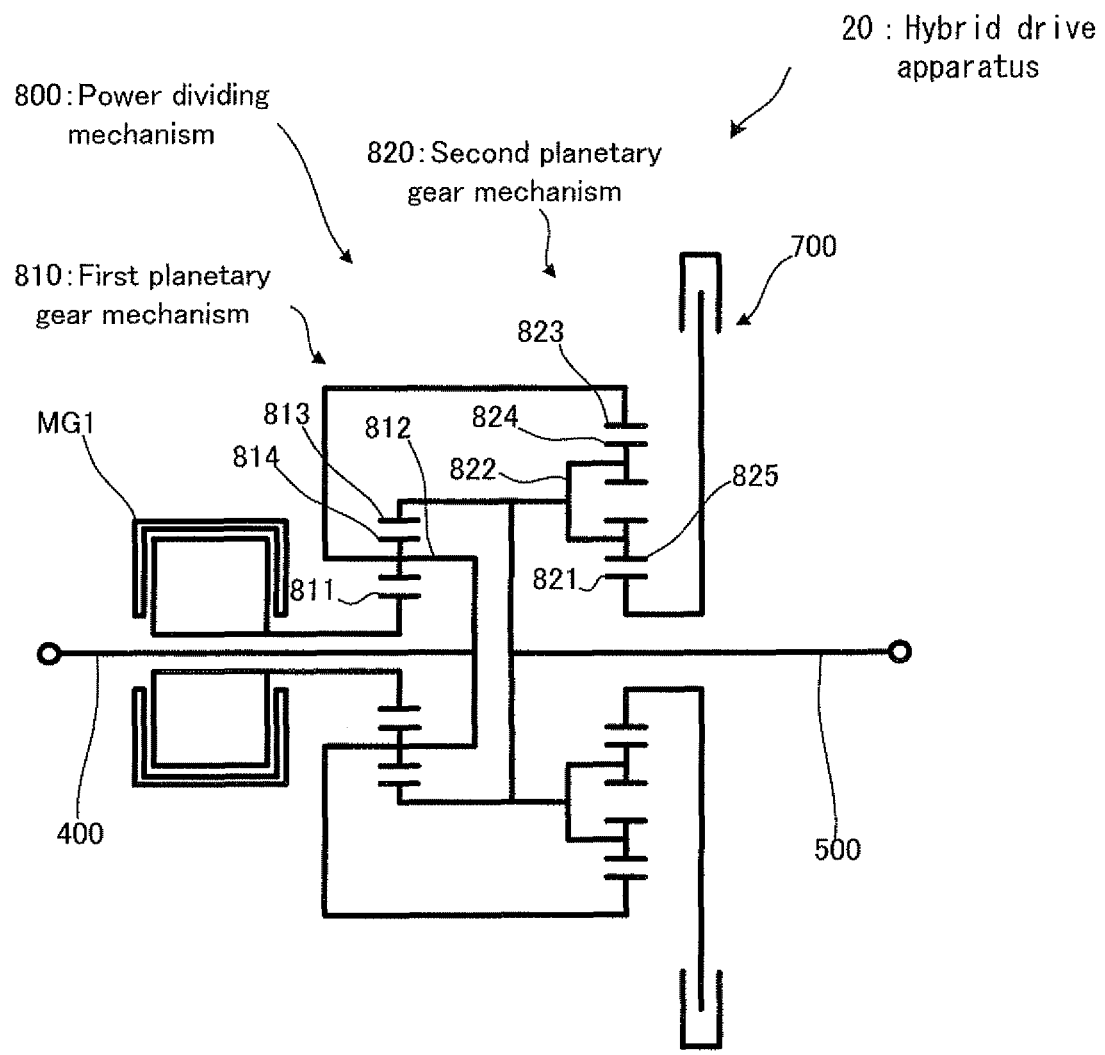

MISLOCKING PREVENTING APPARATUS

TECHNICAL FIELD

The present invention relates to a mislocking preventing apparatus capable of preventing the mislocking of a rotational element in a hybrid vehicle in which a plurality of speed change modes or shift modes can be selected by locking the rotational element.

BACKGROUND ART

As this type of hybrid vehicle, there is one in which the rotation of a generator is fixed (e.g. refer to a patent document 1). According to the hybrid vehicle disclosed in the patent document 1, an engine can be started from an engine stop state while the vehicle is moving.

Incidentally, in the hybrid vehicle, there has been also suggested a technology in which in the case of an OFF failure or an ON failure of a fastener element, the speed change mode is changed to an alternate mode in accordance with the fastener element (e.g. refer to a patent document 2).

On the other hand, a hybrid vehicle having a fixed speed change mode and a stepless speed change mode has been suggested (e.g. refer to a patent document 3).

Moreover, in the hybrid vehicle having the fixed speed change mode and the stepless speed change mode, there has been also suggested one in which the fixed speed change mode is selected if a motor breaks down (e.g. refer to a patent document 4).

Patent document 1: Japanese Patent Application Laid Open No. Hei 9-109694
Patent document 2: Japanese Patent Application Laid Open No. 2006-022844
Patent document 3: Japanese Patent Application Laid Open No. 2004-345527
Patent document 4: Japanese Patent Application Laid Open No. 2005-304229

DISCLOSURE OF INVENTION

Subject to be Solved by the Invention

In the aforementioned various conventional technologies, if the rotational elements are mistakenly locked, no measures are taken. Therefore, according to circumstances, the speed change mode of the hybrid vehicle is changed independently of a driver's will, and drivability is possibly deteriorated.

In view of the aforementioned problems, it is therefore an object of the present invention to provide a mislocking preventing apparatus capable of preventing the mislocking of the rotational element.

Means for Solving the Subject

The above object of the present invention can be achieved by a first mislocking preventing apparatus for preventing mislocking of one rotational element in a hybrid vehicle, the hybrid vehicle provided with: an internal combustion engine; a rotating electrical machine; a power dividing mechanism, which is provided with a plurality of rotational elements capable of mutually differentially rotating and including rotational elements each of which is coupled with an output shaft of the internal combustion engine, an output shaft of the rotating electrical machine, and a drive shaft coupled with an axle, and which can supply at least one portion of power of the internal combustion engine to the drive shaft; and a locking device capable of changing a state of one rotational element of the plurality of rotational elements between a non-lock state in which the one rotational element is released from a fixed member and can rotate and a lock state in which the one rotational element is fixed to the fixed member and cannot rotate, the hybrid vehicle being configured to select between a stepless speed change mode, which corresponds to the non-lock state and in which a transmission gear ratio as a ratio between a rotational speed of the output shaft of the internal combustion engine and a rotational speed of the drive shaft is continuously variable, and a fixed speed change mode, which corresponds to the lock state in which the transmission gear ratio is fixed, the mislocking preventing apparatus provided with: a specifying device for specifying a rotational state of the one rotational element; and a judging device for judging whether or not the one rotational element is in a predetermined mislocking state on the basis of the specified rotational state.

The power dividing mechanism of the present invention adopts a form of, for example, a planetary gear mechanism or the like, which is provided with a plurality of rotational elements capable of mutually differentially rotating and including rotational elements each of which is directly or indirectly coupled with or can be connected to the output shaft of the internal combustion engine, the output shaft of the rotating electrical machine which can adopt a form of a motor or a motor generator or the like as a preferred form, and the drive shaft coupled with the axle (namely, the rotational element corresponding to each power element is at least one portion of the rotational elements provided for the power dividing mechanism and is not necessarily all of them). The power dividing mechanism is configured to supply at least one portion of the power of the internal combustion engine to the drive shaft coupled with the axle regardless of directly or indirectly, by the differential action of this rotational element.

The locking device of the present invention conceptually includes a device capable of fixing the one rotational element (hereinafter referred to as a "lock-target rotational element" as occasion demands) out of the plurality of rotational elements to the fixed member regardless of directly or indirectly and capable of releasing it from the fixed member. As a preferred form, it can adopt various aspects such as a self-lock type engaging apparatus including a cam-lock mechanism or the like, a friction engaging apparatus including a wet multi-plate brake or the like, or a rotational synchronization meshing apparatus including a dog clutch mechanism or the like. The hybrid vehicle of the present invention can change the speed change mode for defining the transmission gear ratio as the rotational speed ratio of the output shaft of the internal combustion engine represented by a crankshaft or the like and the drive shaft, between the stepless speed change mode and the fixed speed change mode. Incidentally, at this time, there may be a single or a plurality of gear steps or shift steps which belong to one speed change mode.

The stepless speed change mode corresponds to the case where the lock-target rotational element is in the non-lock state in which it is released from the fixed member and can rotate. The stepless speed change mode indicates a control aspect for controlling the transmission gear ratio in which the transmission gear ratio can be changed theoretically, substantially, or continuously (including a stepwise aspect as well as being practically continuous), in a range of physical, mechanical, mechanistic, or electrical restriction defined in advance. As a preferred form, it is realized by setting the rotating electrical machine or the rotational element coupled with the rotating electrical machine as a reaction element for bearing the reaction torque of the internal combustion engine and by controlling its rotational speed with the rotating electrical machine, or the like. In the stepless speed change mode, the operating point of the internal combustion engine (a point for defining one operating condition of the internal combustion engine defined by an engine rotational speed and a torque) is arbitrarily selected, theoretically, substantially, or in a range of some restriction. For example, the operating point is controlled to an optimal fuel economy operating point at which the fuel economy is minimized, theoretically, substantially or in a range of some restriction.

On the other hand, the fixed speed change mode corresponds to the case where the lock-target rotational element is in the lock state in which it is fixed to the fixed member regardless of directly or indirectly and cannot rotate. The fixed speed change mode indicates a control aspect in which the transmission gear ratio is fixed to one value. For example, it is assumed that the differential aspect of each rotational element in the power dividing mechanism is defined such that if the rotational speeds of two elements or two element groups out of three types of rotational elements or rotational element groups are determined, then, the rotational speed of the remaining one rotational element or one rotational element group is inevitably determined, wherein the three types of rotational elements or rotational element groups are the rotational element or rotational element group coupled with the output shaft of the internal combustion engine, the rotational element or rotational element group coupled with the output shaft of the rotating electrical machine, and the rotational element or rotational element group coupled with the drive shaft. In this case, if the lock-target rotational element is in the lock state, the engine rotational speed of the internal combustion engine can be uniquely defined by the rotation of the rotational element on the drive shaft side limited by a vehicle speed. Thus, this type of fixed speed change mode can be preferably realized.

In the fixed speed change mode, the internal combustion engine loses the degree of freedom in the operating point selection. Thus, for example, if the lock-target rotational element is locked under the condition that it is originally not to be locked (this state is referred to as "mislocking" as occasion demands), the internal combustion engine is likely forced to operate at the operating point at which it is defined that it is to be avoided, on the basis of experiments, experiences, theories, simulations or the like in advance. The operation at the operating point likely causes the deterioration in drivability. The first mislocking preventing apparatus of the present invention is configured to prevent the mislocking of the lock-target rotational element in order to avoid the deterioration in drivability.

According to the first mislocking preventing apparatus of the present invention, the rotational state of the lock-target rotational element, which is the one rotational element of the power dividing mechanism whose state is selectively changed between the lock state and non-lock state by the action of the locking device, is specified by the specifying device which can adopt forms of various computer systems such as various processing units like an Electronic Control Unit (ECU) or the like, various controllers or microcomputer apparatuses. On the basis of the specified rotational state, it is judged whether or not the lock-target rotational element is in the mislocking state by the judging device which can adopt forms of various computer systems such as various processing units like an ECU or the like, various controllers or microcomputer apparatuses.

Here, the "mislocking state" defined for the lock-target rotational element conceptually includes a state in which the locking under the condition that the lock-target rotational element is originally not to be locked (i.e. mislocking) occurs, a state in which the mislocking supposedly occurs, a state in which the mislocking is predicted to occur in the near future if no measures are taken, a state in which it is defined that the mislocking highly likely occurs on the basis of experiments, experiences, theories, simulations, or the like in advance (incidentally, "highly" in this case means that it is greater than or equal to a reference value which can be set individually and specifically in accordance with the degree of requirement for the avoidance of the mislocking), or similar states. The mislocking state is a state in a broad sense which is not necessarily limited to whether or not the mislocking occurs as an actual phenomenon. Incidentally, the wording "specify" of the present invention conceptually includes detect, estimate, calculate, derive, identify, determine, obtain, and the like. The process that the specifying device specifies the rotational state of the lock-target rotational element is not limited in any ways.

On the other hand, considering that the mislocking state of the lock-target rotational element includes the state in which the lock-target rotational element has not been locked as described above, in order to accurately judge whether or not the lock-target rotational element is in the mislocking state of the present invention, there is required a judgment element which can be sufficiently applied even to the situation that the lock-target rotational element has not been locked yet. In the first mislocking preventing apparatus of the present invention, the rotational state of the lock-target rotational element specified by the specifying device is used as the judgment element. Incidentally, the "rotational state" conceptually includes a binary state indicating whether or not it is rotated, a continuous and quantitative state defined by various index values such as a rotational speed and rotational angular velocity, and a stepwise state including each of categories resulting from categorization according to a reference value which can determine this type of index value as occasion demands.

In particular, here, the lock-target rotational element is merely a rotational element, and the locking device is a mechanism or apparatus capable of fixing this rotational element to the fixed member under various configurations. Therefore, in a state transition process in which the state of the lock-target rotational element transits from the non-lock state to the lock state, a change appears in the rotational state of the lock-target rotational element. Moreover, in view of a physical action for fixing a rotor, although there is a large or small influence according to the physical, mechanical, or electrical configuration of the locking device, the degree of how easily the lock-target rotational element is fixed to the fixed member depends on the rotational state with high probability. In other words, the rotational state of the lock-target rotational element obviously not only is useful as a judgment element associated with whether or not the lock-target rotational element has been already locked but also can extremely effectively function as judgment elements for judging whether or not it is locked, whether or not it is easily locked, how much possibility there is to be locked, and the like.

As described above, the judging device of the present invention can accurately judge not only whether or not the mislocking has already occurred in the lock-target rotational element on the basis of the rotational state of the lock-target rotational element, but also whether the state of the lock-target rotational element at the current time point corresponds to a situation in which the mislocking likely occurs, whether or not the mislocking will occur in the lock-target rotational element in the near future, or the like, in the situation that the mislocking has not occurred yet. Therefore, it is possible to promote an accurate response corresponding to the concept of the "mislocking" of the present invention, such as (1) taking measures for canceling the mislocking, (2) taking measures for forestalling the occurrence of the mislocking, (3) taking measures such that the mislocking will not recur, or (4) informing a driver of the occurrence of the mislocking, and it is possible to preferably prevent the mislocking of the lock-target rotational element.

Incidentally, in the situation that the fixed speed change mode is to be selected as the speed change mode, it is no problem that the lock-target rotational element is locked. Thus, the judging device may perform the aforementioned judgment in view of a condition of selecting the speed change mode, as occasion demands, in addition to the specified rotational speed. At this time, if the speed change mode to be selected is determined in accordance with the operating condition of the hybrid vehicle (e.g. a vehicle speed, a required driving force, etc.), the judgment associated with the mislocking state may be also performed in view of the operating condition.

In one aspect of the first mislocking preventing apparatus of the present invention, it is further provided with a controlling device for controlling the internal combustion engine or the rotating electrical machine to reduce a torque acting in a direction of promoting the mislocking in the one rotational element or to apply a torque in a direction opposite to the direction of promoting the mislocking if it is judged that the one rotational element is in the mislocking state.

According to this aspect, if it is judged that the lock-target rotational element is in the mislocking state, the internal combustion engine or the rotating electrical machine is controlled to reduce the torque acting in the direction of promoting the mislocking or to apply the torque in the direction opposite to the direction of promoting the mislocking, by the controlling device which can adopt forms of various computer systems such as various processing units like an ECU or the like, various controllers or microcomputer apparatuses. Thus, if the mislocking has already occurred, the cancellation of the mislocking is promoted, or in the situation that the mislocking tends to occur, the possibility of the occurrence of the mislocking is reduced. In other words, it is possible to prevent the mislocking of the lock-target rotational element, more positively or actively. Incidentally, the "direction of promoting the mislocking" is a direction which can be determined as occasion demands in accordance with the configuration of the locking device, the rotational direction of the lock-target rotational element when it is judged to be in the mislocking state, or the like.

Here, the action indicating "to reduce the torque acting in the direction of promoting the mislocking" (hereinafter referred to as a "first action" as occasion demands) and the action indicating "to apply the torque in the direction opposite to the direction of promoting the mislocking" (hereinafter referred to as a "second action" as occasion demands) are not necessarily conceptually different from each other. There is no difference in that the mislocking is preferably prevented by preferably cancelling the mislocking which likely occurs, which is about to occur, or which occurs due to the torque control performed by the internal combustion engine or the rotating electrical machine.

However, the first action is useful if the rotational state of the lock-target rotational element is actively controlled in the stepless speed change mode or in similar cases, as a preferred form. In other words, in this case, the "mislocking state" of the lock-target rotational element preferably indicates a state in which the mislocking has not occurred yet as the actual phenomenon. The first action can exert a beneficial effect indicating that the possibility that the mislocking occurs is reduced by suppressing an excessive change in the rotational state of the lock-target rotational element. On the other hand, the second action is different from what is presented from a preventive viewpoint in view of the possibility that the mislocking is caused by a change in the rotational speed of the lock-target rotational element as a preferred form, and it is useful if the mislocking occurs or starts to occur in the lock-target rotational element for whatever reason or in similar cases. In other words, in this case, the "mislocking state" of the lock-target rotational element preferably indicates the situation that the mislocking occurs as the actual phenomenon, and the second action can exert a beneficial effect indicating that the mislocking which has already occurred or which is about to occur is canceled.

In another aspect of the first mislocking preventing apparatus of the present invention, the specifying device specifies angular acceleration of the one rotational element as the rotational state of the one rotational element, and the judging device judges that the one rotational element is in the mislocking state if the specified angular acceleration is greater than or equal to a predetermined value.

In view of the physical configuration of the locking device that the lock-target rotational element is locked by fixing the lock-target rotational element to the fixed member regardless of directly or indirectly, the relatively larger angular acceleration has a higher possibility to cause the mislocking than the relatively smaller angular acceleration does. According to this aspect, by the operations of the judging device focusing on this point, if the angular acceleration of the lock-target rotational element is greater than or equal to the predetermined value (incidentally, the expression of "greater than or equal to" can be conceptually replaced by "greater than" depending on how to set the predetermined value, and to which area the predetermined value belongs does not influence the essence of the present invention), it is judged that the lock-target rotational element is in the mislocking state.

Thus, by setting the predetermined value so as to be suitable for the judgment associated with the mislocking state (e.g. so as to prevent the expansion of an operation restriction by detecting the mislocking before its occurrence and by offsetting it excessively to a safe side, or so as to detect the mislocking before its occurrence and substantially simultaneously with its occurrence) on the basis of the experiments, experiences, theories, simulations or the like in advance, it is possible to detect the mislocking with desired detection accuracy and it is practically useful.

In another aspect of the first mislocking preventing apparatus of the present invention, the specifying device specifies a rotational speed of the one rotational element as the rotational state of the one rotational element, and the judging device judges that the one rotational element is in the mislocking state if a state in which the specified rotational speed is zero continues for a predetermined time in a situation in which the stepless speed change mode is to be selected.

The rotation of the lock-target rotational element is completely or almost stopped in the lock state, regardless of whether it is the mislocking or normal locking. On the other hand, in the non-lock state, even if the rotational state of each rotational element is fixed accidentally or intentionally, there is a rotation change to a greater or lesser degree in a microscopic sense, as opposed to the lock state. Therefore, if the state in which the rotational speed of the lock-target rotational element is zero continues for the predetermined time although the operating condition of the hybrid vehicle corresponds to the condition that the stepless speed change mode is originally to be selected, then, it is possible to judge that the mislocking occurs in the lock-target rotational element with high probability.

In another aspect of the first mislocking preventing apparatus of the present invention, the locking device is provided with: a friction part at rest with respect to the fixed member; a cam which can rotate integrally with the one rotational element; a clutch plate which can move between a contact position at which the clutch plate is in contact with the friction part and a non-contact position at which the clutch plate is not in contact with the friction part; an actuator which can apply to the clutch plate a driving force that draws the clutch plate to the contact position; and a mediate member laid between the cam and the clutch plate, and the locking device is a cam-lock apparatus in which the cam, the mediate member and the clutch plate can integrally rotate if the clutch plate is at the non-contact state and in which a pressing force for pressing the clutch plate in a direction of the friction part is supplied from the mediate member to the clutch plate if the clutch plate is at the contact position and a torque is applied to the cam in a predetermined direction.

In this type of cam-lock apparatus, once the lock state is obtained, the lock state can be maintained by a so-called self-lock effect. Thus, it is extremely efficient. On the other hand, since the mislocking influenced by the rotational state of the lock-target rotational element tends to occur relatively easily, the mislocking preventing apparatus of the present invention is remarkably effective.

Incidentally, in this aspect, the first mislocking preventing apparatus may be further provided with a limiting device for limiting a rotational speed of the rotating electrical machine to an upper-limit rotational speed or less if it is judged that the one rotational element is in the mislocking state, wherein the upper-limit rotational speed is set in a range of less than a rotational speed corresponding to the mislocking that occurred in the past.

If the locking device is configured as this type of cam-lock apparatus, between the rotational speed of the lock-target rotational element and the possibility that the mislocking occurs in the lock-target rotational element, there is such a relatively high relation that the mislocking occurs more highly likely as the rotational speed of the lock-target rotational speed becomes higher. Therefore, in a rotational speed or rotation area in which the mislocking occurs once, the possibility of recurrence of the mislocking is high.

According to this aspect, if it is judged that the lock-target rotational element is in the mislocking state, the rotational speed of the rotating electrical machine is limited to the upper-limit rotational speed or less by the limiting device which can adopt forms of various computer systems such as various processing units like an ECU or the like, various controllers or microcomputer apparatuses. At this time, the upper-limit rotational speed is set as a value of less than the rotational speed of the rotating electrical machine corresponding to the mislocking that occurred in the past. Thus, it is possible to preferably prevent the recurrence of the mislocking.

Incidentally, the limiting device may limit the rotation of the rotating electrical machine when the preset number of mislockings occur in the lock-target rotational element. By this, it is possible to allow the mislocking which accidentally occurs, and it is possible to maintain the driving performance of the hybrid vehicle as much as possible.

Moreover, if the limiting device is provided, the first mislocking preventing device may be further provided with a setting device for setting the upper-limit rotational speed on the basis of at least one of an elapsed time from a reference time, and a driving condition and an environmental condition.

The reproducibility of the mislocking in one rotational speed is neither 0% nor 100%. Thus, in setting the upper-limit rotational speed, an accurate index is required. According to this aspect, the upper-limit rotational speed is set preferably as a variable value as occasion demands, on the basis of the elapsed time from the reference time point (e.g. a time point at which it is judged that the lock-target rotational element is in the mislocking state, or the like), the driving condition of the hybrid vehicle such as a vehicle speed, or the environmental condition of the hybrid vehicle such as a temperature, or the like, by the setting device which can adopt forms of various computer systems such as various processing units like an ECU or the like, various controllers or microcomputer apparatuses. Thus, it is possible to maintain the driving performance of the hybrid vehicle as much as possible while preventing the mislocking, and it is practically useful.

In another aspect of the first mislocking preventing apparatus of the present invention, the hybrid vehicle is further provided with another rotating electrical machine which is different from the rotating electrical machine coupled with the drive shaft.

According to this aspect, there is provided the rotating electrical machine, such as a motor or a motor generator, directly coupled with the drive shaft or indirectly coupled with the drive shaft via various transmission gear mechanisms or various reduction gear mechanisms as occasion demands. Thus, highly efficient hybrid driving can be performed by cooperatively controlling the rotating electrical machine and the internal combustion engine.

The above object of the present invention can be achieved by a second mislocking preventing apparatus for preventing mislocking of one rotational element in a hybrid vehicle, the hybrid vehicle provided with: an internal combustion engine; a rotating electrical machine; a power dividing mechanism, which is provided with a plurality of rotational elements capable of mutually differentially rotating and including rotational elements each of which is coupled with an output shaft of the internal combustion engine, an output shaft of the rotating electrical machine, and a drive shaft coupled with an axle, and which can supply at least one portion of power of the internal combustion engine to the drive shaft; and a locking device capable of changing a state of one rotational element of the plurality of rotational elements between a non-lock state in which the one rotational element is released from a fixed member and can rotate and a lock state in which the one rotational element is fixed to the fixed member and cannot rotate, the hybrid vehicle being configured to select between a stepless speed change mode, which corresponds to the non-lock state and in which a transmission gear ratio as a ratio between a rotational speed of the output shaft of the internal combustion engine and a rotational speed of the drive shaft is continuously variable, and a fixed speed change mode, which corresponds to the lock state in which the transmission gear ratio is fixed, the mislocking preventing apparatus provided with: a specifying device for specifying a rotational state of the one rotational element; and a controlling device for controlling the internal combustion engine or the rotating electrical machine to reduce a torque acting in a direction of promoting the mislocking in the one rotational element or to apply a torque in a direction opposite to the direction of promoting the mislocking on the basis of the specified rotational state.

According to the second mislocking preventing apparatus of the present invention, the internal combustion engine or the rotating electrical machine is controlled to reduce the torque acting in the direction of promoting the mislocking in the one rotational element or to apply the torque in the direction opposite to the direction of promoting the mislocking, by the controlling device equivalent to the controlling device described above, on the basis of the rotational speed of the lock-target rotational speed specified in the same manner as that of the first mislocking preventing apparatus described above. In other words, according to the second mislocking preventing apparatus, if a predetermined condition defined on the basis of the rotational state of the lock-target rotational element is satisfied without through a process of judging whether or not the lock-target rotational element is in the mislocking state, the mislocking which likely occurs, which is about to occur, or which has occurred is canceled. Therefore, a time loss in preventing or canceling the mislocking is further reduced, and it is efficient.

In one aspect of the second mislocking preventing apparatus of the present invention, the specifying device specifies angular acceleration of the one rotational element as the rotational state of the one rotational element, and the controlling device controls the internal combustion engine or the rotating electrical machine if the specified angular acceleration is greater than or equal to a predetermined value.

According to this aspect, if the angular acceleration of the lock-target rotational element is greater than or equal to the predetermined value, the torque acting in the direction of promoting the mislocking is reduced, or the torque is supplied in the direction opposite to the direction of promoting the mislocking. Thus, it is possible to prevent the mislocking of the lock-target rotational element, accurately and quickly.

In another aspect of the second mislocking preventing apparatus of the present invention, the specifying device specifies a rotational speed of the one rotational element as the rotational state of the one rotational element, and the controlling device controls the internal combustion engine or the rotating electrical machine if a state in which the specified rotational speed is zero continues for a predetermined time in a situation in which the stepless speed change mode is to be selected.

According to this aspect, if the state in which the rotational speed of the lock-target rotational element is zero continues for the predetermined time in the situation in which the stepless speed change mode is to be selected, the torque acting in the direction of promoting the mislocking is reduced, or the torque is supplied in the direction opposite to the direction of promoting the mislocking. Thus, it is possible to prevent the mislocking of the lock-target rotational element, quickly.

In another aspect of the second mislocking preventing apparatus of the present invention, the locking device is provided with: a friction part at rest with respect to the fixed member; a cam which can rotate integrally with the one rotational element; a clutch plate which can move between a contact position at which the clutch plate is in contact with the friction part and a non-contact position at which the clutch plate is not in contact with the friction part; an actuator which can apply to the clutch plate a driving force that draws the clutch plate to the contact position; and a mediate member laid between the cam and the clutch plate, and the locking device is a cam-lock apparatus in which the cam, the mediate member and the clutch plate can integrally rotate if the clutch plate is at the non-contact state and in which a pressing force for pressing the clutch plate in a direction of the friction part is supplied from the mediate member to the clutch plate if the clutch plate is at the contact position and a torque is applied to the cam in a predetermined direction.

In this type of cam-lock apparatus, once the lock state is obtained, the lock state can be maintained by a so-called self-lock effect. Thus, it is extremely efficient. On the other hand, since the mislocking influenced by the rotational state of the lock-target rotational element tends to occur relatively easily, the mislocking preventing apparatus of the present invention is remarkably effective.

Incidentally, in this aspect, the second mislocking preventing apparatus may be further provided with a limiting device for limiting a rotational speed of the rotating electrical machine to an upper-limit rotational speed or less if it is judged that the one rotational element is in the mislocking state, wherein the upper-limit rotational speed is set in a range of less than a rotational speed corresponding to the mislocking that occurred in the past.

According to this aspect, as in the case of the first mislocking preventing apparatus described above, if it is judged that the lock-target rotational element is in the mislocking state, the rotational speed of the rotating electrical machine is limited to the upper-limit rotational speed or less by the limiting device which can adopt forms of various computer systems such as various processing units like an ECU or the like, various controllers or microcomputer apparatuses. At this time, the upper-limit rotational speed is set as a value of less than the rotational speed of the rotating electrical machine corresponding to the mislocking that occurred in the past. Thus, it is possible to preferably prevent the recurrence of the mislocking.

Moreover, if the limiting device is provided, the second mislocking preventing apparatus may be further provided with a setting device for setting the upper-limit rotational speed on the basis of at least one of an elapsed time from a reference time, and a driving condition and an environmental condition.

In this case, as in the case of the first mislocking preventing apparatus, it is possible to maintain the driving performance of the hybrid vehicle as much as possible while preventing the mislocking, and it is practically useful.

In another aspect of the second mislocking preventing apparatus of the present invention, the hybrid vehicle is further provided with another rotating electrical machine which is different from the rotating electrical machine coupled with the drive shaft.

According to this aspect, there is provided the rotating electrical machine, such as a motor or a motor generator, directly coupled with the drive shaft or indirectly coupled with the drive shaft via various transmission gear mechanisms or various reduction gear mechanisms as occasion demands. Thus, highly efficient hybrid driving can be performed by cooperatively controlling the rotating electrical machine and the internal combustion engine.

The operation and other advantages of the present invention will become more apparent from the embodiments explained below.

BRIEF DESCRIPTION OF DRAWINGS

FIG. 14 is a schematic configuration diagram conceptually showing the structure of a hybrid drive apparatus in a fifth embodiment of the present invention.

Figure 1:
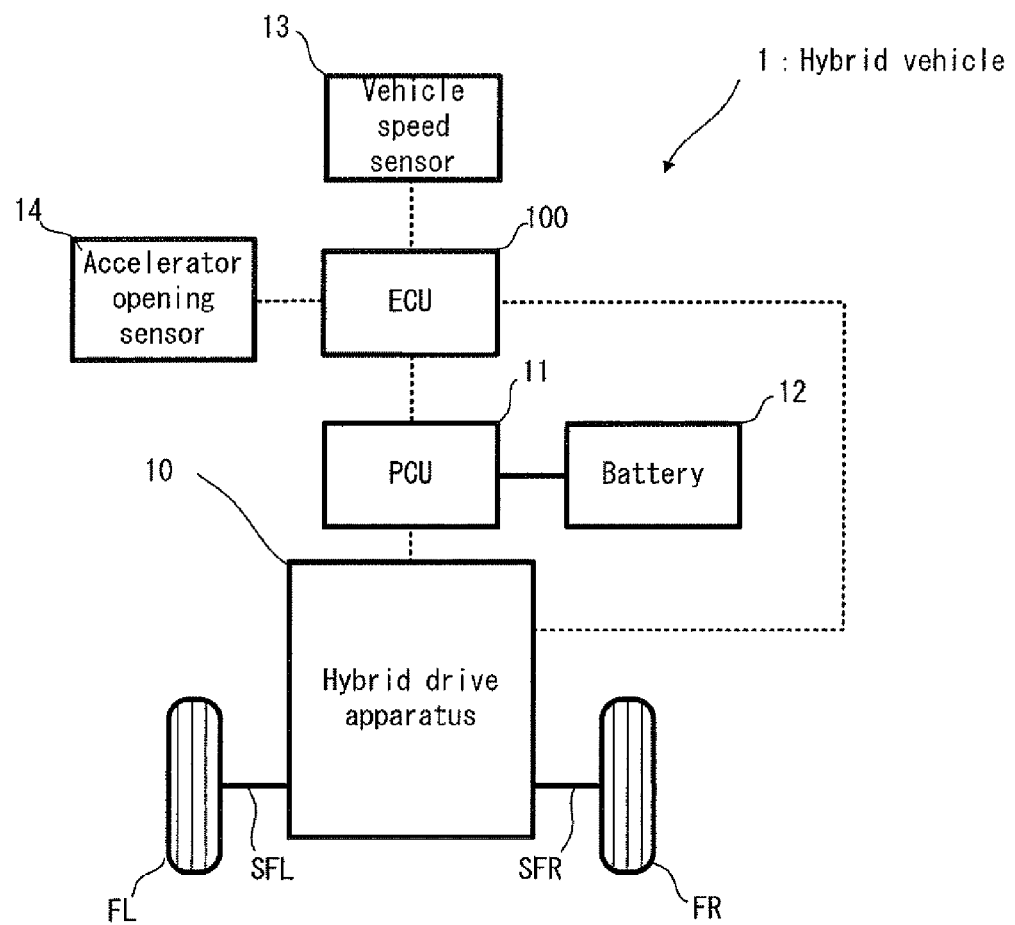
FIG. 1 is a schematic configuration diagram conceptually showing the structure of a hybrid vehicle in a first embodiment of the present invention.

DESCRIPTION OF REFERENCE CODES 1 hybrid vehicle
10 hybrid drive apparatus
20 hybrid drive apparatus
100 ECU
200 engine
205 crankshaft
300 power dividing mechanism
310 sun gear shaft
S1 sun gear
C1 carrier
R1 ring gear
MG1 motor generator
MG2 motor generator
400 input shaft
500 drive shaft
600 reduction gear mechanism
700 brake mechanism
800 power dividing mechanism

BEST MODE FOR CARRYING OUT THE INVENTION

Embodiments of the Invention

Hereinafter, various preferred embodiments of the present invention will be explained with reference to the drawings.

1: First Embodiment 1-1: Structure of Embodiment

Firstly, with reference to FIG. 1, an explanation will be given on the structure of a hybrid vehicle 1 in a first embodiment of the present invention. FIG. 1 is a schematic configuration diagram conceptually showing the structure of the hybrid vehicle 1.

In FIG. 1, the hybrid vehicle 1 is provided with: a hybrid drive apparatus 10; a Power Control Unit (PCU) 11; a battery 12; a vehicle speed sensor 13; an accelerator opening sensor 14; and an ECU 100. The hybrid vehicle 1 is one example of the "hybrid vehicle" of the present invention.

The ECU 100 is provided with a Central Processing Unit (CPU), a Read Only Memory (ROM), a RAM and the like. The ECU 100 is an electronic control unit capable of controlling the operations of each part of the hybrid vehicle 1. The ECU 100 is one example of the "specifying device", the "judging device" and the "controlling device" of the present invention. The ECU 100 can perform mislocking prevention control described later, in accordance with a control program stored in the ROM. Incidentally, the ECU 100 is a unified or one-body electronic control unit configured to function as one example of each of the aforementioned devices, and all the operations of the respective devices are performed by the ECU 100. However, the physical, mechanical and electrical configurations of each of the aforementioned devices of the present invention are not limited to this. For example, each of the devices may be configured as various computer systems such as a plurality of ECUs, various processing units, various controllers or microcomputer apparatuses.

The PCU 11 includes a not-illustrated inverter which can convert direct-current (DC) power extracted from the battery 12 to alternating-current (AC) power and supply it to a motor generator MG1 and a motor generator MG2 described later and which can convert AC power generated by the motor generator MG1 and the motor generator MG2 to DC power and supply it to the battery 12. The PCU 11 is a power control unit capable of controlling the input/output of the electric power between the battery 12 and each motor generator, or the input/output of the electric power between the motor generators (i.e. in this case, the electric power is transferred between the motor generators without via the battery 12). The PCU 11 is electrically connected to the ECU 100, and the operations of the PCU 11 are controlled by the ECU 100.

The battery 12 is a chargeable storage battery device which functions as an electric power source associated with the electric power for the power running of the motor generator MG1 and the motor generator MG2.

The vehicle speed sensor 13 is a sensor capable of detecting a vehicle speed V of the hybrid vehicle 1. The vehicle speed sensor 13 is electrically connected to the ECU 100, and the detected vehicle speed V is referred to by the ECU 100 with a constant or irregular period.

The accelerator opening sensor 14 is a sensor capable of detecting an accelerator opening degree Ta which is the operation amount of a not-illustrated accelerator pedal of the hybrid vehicle 1. The accelerator opening sensor 14 is electrically connected to the ECU 100, and the detected accelerator opening degree Ta is referred to by the ECU 100 with a constant or irregular period.

Figure 2:
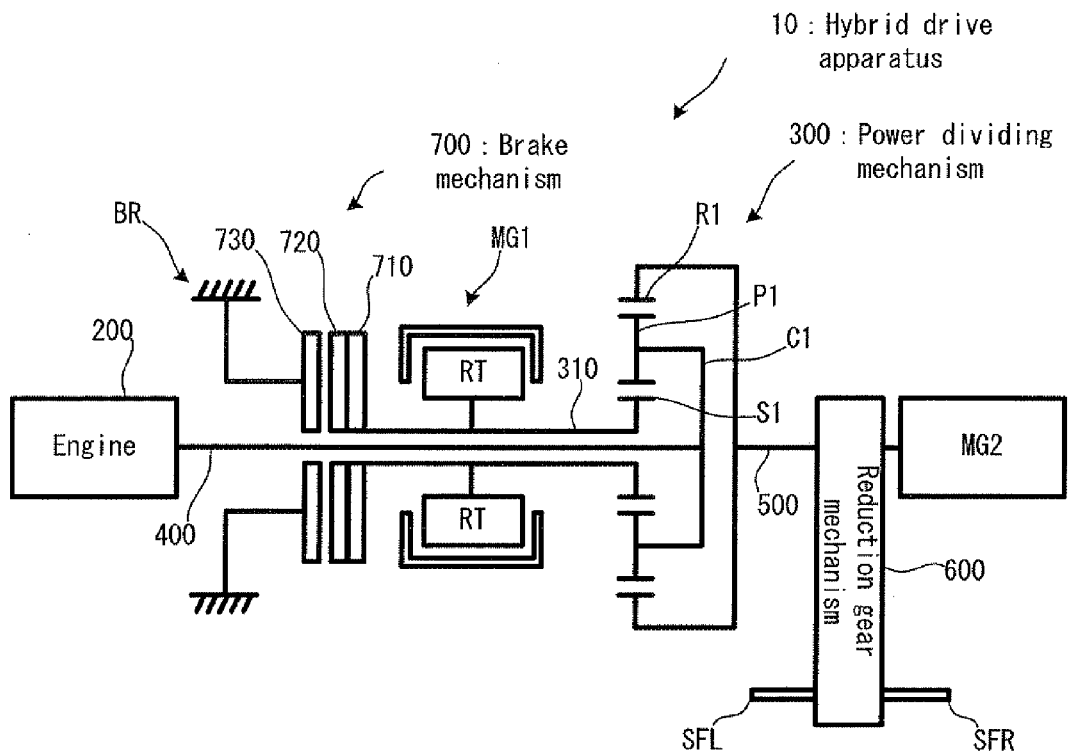
FIG. 2 is a schematic configuration diagram conceptually showing the structure of a hybrid drive apparatus in the hybrid vehicle in FIG. 1.

The hybrid drive apparatus 10 is a power unit which functions as a power train of the hybrid vehicle 1. Now, with reference to FIG. 2, the detailed structure of the hybrid drive apparatus 10 will be explained. FIG. 2 is a schematic configuration diagram conceptually showing the structure of the hybrid drive apparatus 10. Incidentally, in FIG. 2, portions overlapping those of FIG. 1 will carry the same reference numerals, and the explanation thereof will be omitted as occasion demands.

In FIG. 2, the hybrid drive apparatus 10 is provided with an engine 200, a power dividing mechanism 300, a motor generator MG1 (hereinafter abbreviated to as a "MG1" as occasion demands), a motor generator MG2 (hereinafter abbreviated to as a "MG2" as occasion demands), an input shaft 400, a drive shaft 500, a reduction gear mechanism 600 and a brake mechanism 700.

Figure 3:
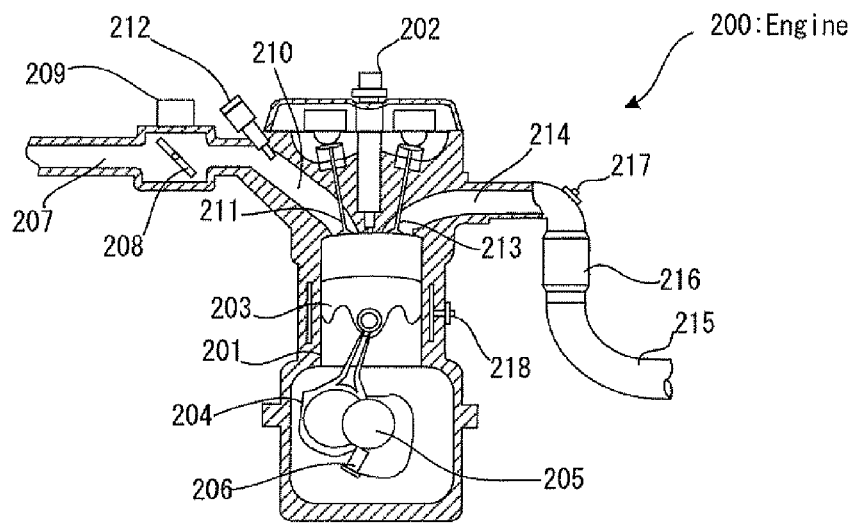
FIG. 3 is a schematic diagram showing one cross-sectional structure of an engine provided for the hybrid drive apparatus in FIG. 2.

The engine 200 is a gasoline engine as one example of the "internal combustion engine" of the present invention, and it functions as a main power source of the hybrid vehicle 1. Now, with reference to FIG. 3, the detailed structure of the engine 200 will be explained. FIG. 3 is a schematic diagram showing one cross-sectional structure of the engine 200. Incidentally, in FIG. 3, portions overlapping those of FIG. 1 and FIG. 2 will carry the same reference numerals, and the explanation thereof will be omitted as occasion demands. Incidentally, the "internal combustion engine" of the present invention includes for example a two-cycle or four-cycle reciprocating engine or the like and conceptually includes an engine configured to have at least one cylinder and to extract a force generated when an air-fuel mixture including various fuels such as gasoline, light oil or alcohol is burned in a combustion chamber within the cylinder, as a driving force via a physical or mechanical transmitting device such as a piston, a connecting rod, and a crankshaft, as occasion demands. As long as the concept is satisfied, the structure of the internal combustion engine of the present invention is not limited to that of the engine 200 but may have various aspects.

In FIG. 3, the engine 200 is configured to burn the air-fuel mixture through an ignition operation performed by an ignition apparatus 202 in which one portion of an ignition plug or spark plug (whose reference numeral is omitted) is exposed to the combustion chamber in a cylinder 201. At the same time, the engine 200 is configured to convert reciprocating motion of a piston 203 generated in accordance with an explosive power caused by the combustion, to rotational motion of a crankshaft 205 as an engine output shaft, via a connecting rod 204.

In the vicinity of the crankshaft 205, a crank position sensor 206 for detecting the rotational position of the crankshaft 205 (i.e. a crank angle) is placed. The crank position sensor 206 is electrically connected to the ECU 100 (not illustrated). In the ECU 100, an engine rotational speed NE of the engine 200 is calculated on the basis of a crank angle signal outputted from the crank position sensor 206.

Incidentally, the engine 200 is an in-line four-cylinder engine in which four cylinders 201 are aligned in a direction perpendicular to the plane of the paper. Since the structures of the individual cylinders 201 are equal to each other, only one cylinder 201 will be explained in FIG. 2. Moreover, the number of the cylinders and the arrangement form of the respective cylinders in the internal combustion engine of the present invention are not limited to those of the engine 200 but can adopt various aspects in a range satisfying the aforementioned concept. For example, the engine 200 may be of a six-cylinder, eight-cylinder, or 12-cylinder engine type, or of a V-type, a horizontally-opposed type, or the like.

In the engine 200, the air sucked from the exterior is supplied through an intake tube 207 and an intake port 210 to the inside of the cylinder 201 in the opening of an intake valve 211. On the other hand, a fuel injection valve of an injector 212 is exposed in the intake port 210, and it is configured to inject or spray the fuel to the intake port 210. The fuel injected or sprayed from the injector 212 is mixed with the intake air before or after the valve opening timing of the intake valve 211, to thereby make the aforementioned air-fuel mixture.

The fuel is stored in a not-illustrated fuel tank and is supplied to the injector 212 through a not-illustrated delivery pipe by the action of a not-illustrated feed pump. The air-fuel mixture burned in the cylinder 201 becomes an exhaust gas and is supplied to an exhaust tube 215 through an exhaust port 214 in the opening of an exhaust valve 213 which opens or closes in conjunction with the opening or closing of the intake valve 211.

On the other hand, on the upstream side of the intake port 210 in the intake tube 207, there is disposed a throttle valve 208 capable of adjusting an intake air amount associated with the intake air supplied through a not-illustrated cleaner. The throttle valve 208 is configured such that the driving state thereof is controlled by a throttle valve motor 209, which is electrically connected to the ECU 100. Incidentally, the ECU 100 basically controls the throttle valve motor 209 to obtain a throttle opening degree according to the opening degree of an accelerator pedal not illustrated (i.e. the aforementioned accelerator opening degree Ta); however, it can also adjust the throttle opening degree without a driver's will through the operation control of the throttle valve motor 209. In other words, the throttle valve 208 is configured as a kind of electronically-controlled throttle valve.

In the exhaust tube 215, a ternary or three-way catalyst 216 is placed. The ternary catalyst 216 is configured to purify each of CO (carbon monoxide), HC (hydrocarbon), and NOx (nitrogen oxide), emitted from the engine 200. Incidentally, a form that can be adopted by the catalyst apparatus of the present invention is not limited to such a ternary catalyst. For example, instead of or in addition to the ternary catalyst, various catalysts such as a NSR catalyst (or NOx storage-reduction catalyst) or an oxidation catalyst may be placed.

In the exhaust tube 215, there is placed an air-fuel ratio sensor 21.7 capable of detecting the exhaust air-fuel ratio of the engine 200. Moreover, in a water jacket placed in a cylinder block for accommodating the cylinder 201, a water temperature sensor 218 is disposed in order to detect a coolant temperature associated with a coolant or cooling water (LLC) circulated and supplied to cool the engine 200. Each of the air-fuel ratio sensor 217 and the water temperature sensor 218 is electrically connected to the ECU 100, and the detected air-fuel ratio and the detected coolant temperature are grasped or confirmed by the ECU 100 at a constant or inconstant detection frequency.

Back in FIG. 2, the motor generator MG1 is an electric motor generator as one example of the "rotating electrical machine" of the present invention. The motor generator MG1 is provided with: a power running function for converting electrical energy into kinetic energy; and a regeneration function for converting the kinetic energy into the electrical energy. The motor generator MG2 is an electric motor generator as one example of the "other rotating electrical machine" of the present invention. As in the motor generator MG1, the motor generator MG2 is provided with: the power running function for converting the electrical energy into the kinetic energy; and the regeneration function for converting the kinetic energy into the electrical energy. Incidentally, each of the motor generators MG1 and MG2 is configured as, for example a synchronous electric motor generator, and it is provided with: a rotor having a plurality of permanent magnets on the outer circumferential surface; and a stator around which a three-phase coil for forming a rotating magnetic field is formed; however, it may have another configuration.

The power dividing mechanism 300 is a power transmitting apparatus provided with: a sun gear as one example of the "rotational element" of the present invention, disposed in the central part; a ring gear R1 as another example of the "rotational element" of the present invention, concentrically disposed on the outer circumference of the sun gear S1; a plurality of pinion gears P1, disposed between the sun gear S1 and the ring gear R1 and revolving around the sun gear S1 on the outer circumference of the sun gear S1 while rotating on its axis; and a carrier C1 as yet another example of the "rotational element" of the present invention, for supporting the rotating shaft of each pinion gear.

Here, the sun gear S1 is coupled with a rotor RT of the MG1 via a sun gear shaft 310, and its rotational speed is equivalent to the rotational speed of the MG1 (hereinafter referred to as a "MG1 rotational speed Nmg1" as occasion demands). Moreover, the ring gear R1 is connected to a not-illustrated rotor of the MG2 via the drive shaft 500 and the reduction gear mechanism 600, and its rotational speed is equivalent to the rotational speed of the MG2 (hereinafter referred to as a "MG2 rotational speed Nmg2" as occasion demands). Moreover, the carrier C1 is coupled with the input shaft 400 coupled with the aforementioned crankshaft 205 of the engine 200, and its rotational speed is equivalent to the engine rotational speed NE of the engine 200. Incidentally, in the hybrid drive apparatus 10, each of the MG1 rotational speed Nmg1 and the MG2 rotational speed Nmg2 is detected with a constant period by a rotation sensor such as a resolver and is transmitted to the ECU 100 with a constant or irregular period.

On the other hand, the drive shaft 500 is coupled with drive shafts SFR and SFL (i.e. those drive shafts are one example of the "axle" of the present invention) for driving a right front wheel FR and a left front wheel FL, respectively, which are the drive wheels of the hybrid vehicle 1, via the reduction gear mechanism 600 including various reduction gears such as a differential. Therefore, a motor torque Tmg2 supplied from the motor generator MG2 to the drive shaft 500 (i.e. one example of the "power" of the present invention) is transmitted to each drive shaft via the reduction gear mechanism 600, and a driving force from each drive wheel transmitted via each drive shaft is inputted to the motor generator MG2 via the reduction gear mechanism 600 and the drive shaft 500 in the same manner. In other words, the MG2 rotational speed Nmg2 has a unique relation with the vehicle speed V of the hybrid vehicle 1.

The power dividing mechanism 300 can divide an engine torque Te supplied to the input shaft 400 via the crankshaft 205 from the engine 200 under the aforementioned configuration, into the sun gear S1 and the ring gear R1 at a predetermined ratio (a ratio corresponding to a gear ratio between the gears) by using the carrier C1 and the pinion gear P1, and it can divide the power of the engine 200 into two systems.

More specifically, in order to make it easier to understand the operations of the power dividing mechanism 300, a gear ratio p is defined as the number of the teeth of the sun gear S1 with respect to the number of the teeth of the ring gear R1. In the action of the engine torque Te on the carrier C1 from the engine 200, a torque Tes which appears on the sun gear shaft 310 is expressed by the following equation (1), and a torque Ter which appears on the drive shaft 500 is expressed by the following equation (2).

$$T e s = T e \times \rho/(1+\rho) \quad (1)$$

$$T e r = T e \times 1/(1+\rho) \quad (2)$$

Incidentally, the configuration in the embodiment of the "power dividing mechanism" of the present invention is not limited to that of the power dividing mechanism 300. For example, the power dividing mechanism of the present invention may be provided with a plurality of planetary gear mechanisms, wherein each of the plurality of rotational elements provided for one planetary gear mechanism is coupled with respective one of the plurality of rotational elements provided for another planetary gear mechanism as occasion demands to form a unified or one-body differential mechanism. Moreover, the reduction gear mechanism 600 in the embodiment merely reduces the rotational speed of the drive shaft 500 in accordance with a reduction gear ratio set in advance; however, apart from this type of reduction gear apparatus, the hybrid vehicle 1 may be provided with a step transmission provided with a plurality of transmission steps having a plurality of clutch mechanisms and a brake mechanism as its components.

The brake mechanism 700 includes a cam 710, a clutch plate 720, and an actuator 730 as its main components, and it is configured to selectively change the state of the sun gear S1 between a lock state in which the sun gear S1 cannot rotate and a non-lock state in which the sun gear S1 can rotate. The brake mechanism 700 is a cam-lock type engaging apparatus as one example of the "locking device" of the present invention.

Figure 4:
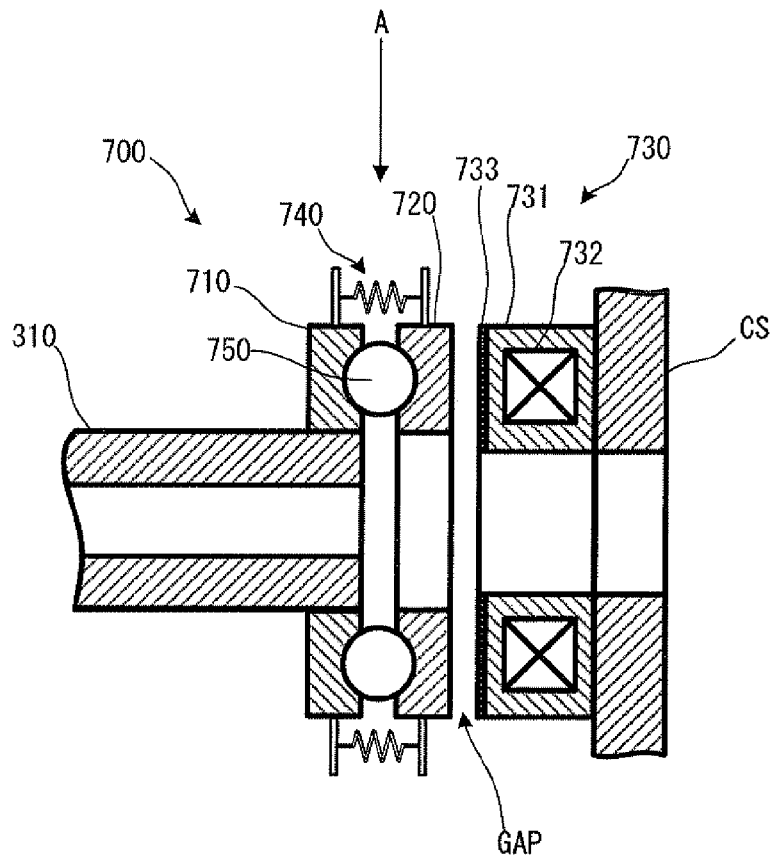
FIG. 4 is a schematic diagram showing one cross-sectional structure of a brake mechanism provided for the hybrid drive apparatus in FIG. 2.

Now, with reference to FIG. 4, the detailed structure of the brake mechanism 700 will be explained. FIG. 4 is a schematic cross sectional view showing one cross-sectional structure of the brake mechanism 700. Incidentally, in FIG. 4, portions overlapping those of FIG. 2 will carry the same reference numerals, and the explanation thereof will be omitted as occasion demands.

In FIG. 4, the brake mechanism 700 is provided with a cam 710, a clutch plate 720, an actuator 730, a return spring 740 and a cam ball 750.

The cam 710 is a substantially disk-shaped engaging member which is coupled with the sun gear shaft 310, which can rotate integrally with the sun gear shaft 310, and which makes a pair with the clutch plate 720. Incidentally, the cam 710 is not necessarily directly coupled with the sun gear 310, and it may be indirectly coupled with the sun gear 310 via various coupling members.

The clutch plate 720 is a disk-shaped engaging member which is made of a magnetic metal material, which is placed opposite to the cam 710, and which makes a pair with the cam 710.

The actuator 730 is one example of the "actuator", including a suction part 731, an electromagnet 732 and a friction part 733.

The suction part 731 is the housing or package of the actuator 730 which is made of a magnetic metal member and which can accommodate the electromagnet 732. The suction part 731 is fixed to a case CS as one example of the "fixed member" of the present invention which is substantially integrally fixed with the outer member of the hybrid drive apparatus 10. In other words, the suction part 731 functions as one example of the "fixed member" of the present invention together with the case CS.

The electromagnet 732 is a magnet capable of generating a magnetic force in an excitation state in which a predetermined excitation current is supplied from a not-illustrated drive part receiving electric power supply form the battery 12. The magnetic force generated from the electromagnet 732 in the excitation state draws the aforementioned clutch plate 720 via the suction part 731 made of the magnetic metal material. Incidentally, this drive part is electrically connected to the ECU 100, and the excitation operation of the electromagnet 732 is superior controlled by the ECU 100.

The friction part 733 is a friction functional body formed on the opposed surface of the clutch plate 720 in the suction part 731. The frictional coefficient of the friction part 733 is set to block the displacement of an object in a contact state more greatly than when the friction part 733 is not formed.

The return spring 740 is an elastic body which is fixed to the clutch 720 at one fixed edge and the cam 710 at the other fixed edge. The return spring 740 biases or applies an electric force to the clutch plate 720 in the direction of the cam 710. Thus, the clutch plate 720 is normally stopped at a non-contact position across a predetermined gap part GAP from the suction part 731 in response to the biasing of the return spring 740.

The cam ball 750 is a sphere as one example of the "mediate member" of the present invention laid between the cam 710 and the clutch plate 720. In the brake mechanism 700, a torque Tmg1 of the motor generator MG1 transmitted to the cam 710 via the sun gear S1 and the sun gear shaft 310 is transmitted to the clutch plate 720, with the cam ball 750 as a transmission element.

Figure 5:
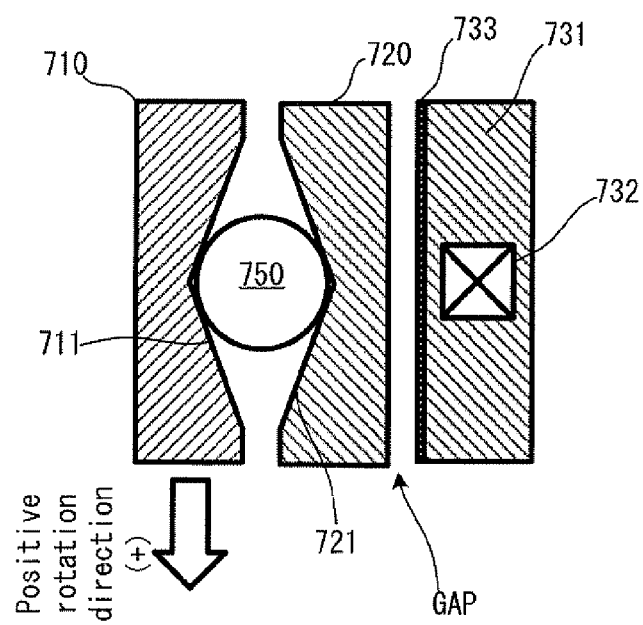
FIG. 5 is a schematic diagram showing one cross-sectional structure of the brake mechanism viewed in an arrow A direction in FIG. 4.

Now, with reference to FIG. 5, the structure of the brake mechanism 700 will be explained, more specifically. FIG. 5 is a schematic cross sectional view showing the brake mechanism 700 viewed in an arrow A direction in FIG. 4. Incidentally, in FIG. 5, portions overlapping those of FIG. 4 will carry the same reference numerals, and the explanation thereof will be omitted as occasion demands.

In FIG. 5, the opposed surface of each of the cam 710 and the clutch plate 720 is formed such that the thickness of the opposed surface in the extending direction of the sun gear shaft 310 becomes smaller as it goes toward its central portion. The cam ball 750 is held near the central portion in which the cam 710 and the clutch plate 720 have the largest opposed space. Thus, if the clutch plate 720 is at the aforementioned non-contact position, the cam 710 and the clutch plate 720 rotate substantially integrally in a direction equal to the rotation direction of the motor generator MG1, with the cam ball 750 as a torque transmission element. Therefore, if the clutch plate 720 is at the aforementioned non-contact position, the rotation of the motor generator MG1 is not blocked at all, at least in practice. Incidentally, in FIG. 5, a downward direction is defined as the positive rotation direction of the motor generator MG1. Further to that, the motor generator MG1 can rotate not only in the positive rotation direction but also in a negative rotation direction (illustration is omitted) precisely opposite to the positive rotation direction.

1-2: Operation of Embodiment 1-2-1: Locking Action of Brake Mechanism 700

Figure 6:
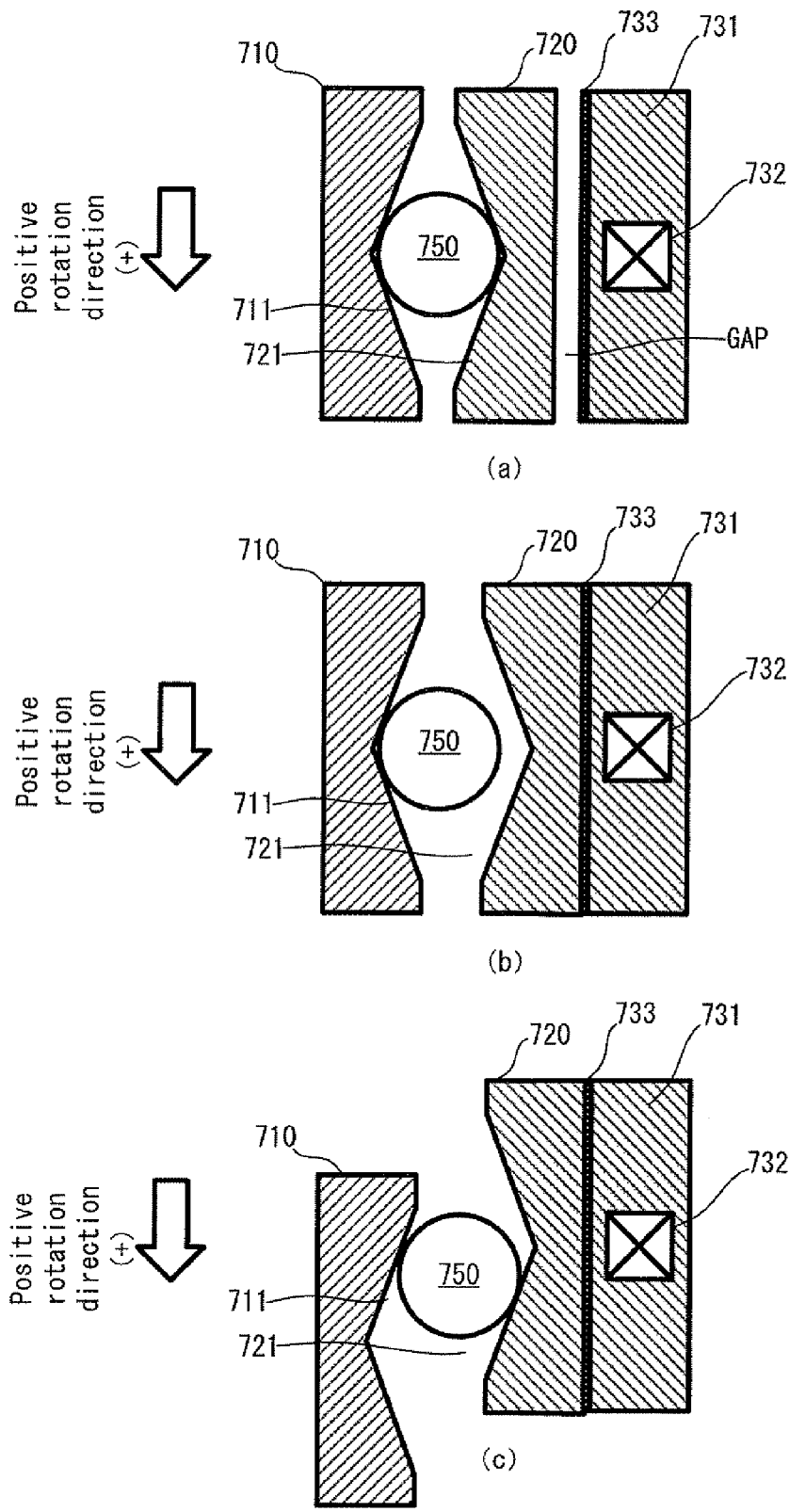
FIG. 6 are schematic cross sectional views explaining a state transition process in which the state of a sun gear transits from a release state to a lock state due to the locking action of the brake mechanism in FIG. 4.

In the hybrid drive apparatus 10, the brake mechanism 700 can selectively change the state of the sun gear S1 between the lock state and the non-lock state, with the sun gear S1 as the "one rotational element" of the present invention, i.e. the aforementioned lock-target rotational element. Now, with reference to FIG. 6, an explanation will be given on the locking action of the sun gear S1 by the brake mechanism 700. FIG. 6 are schematic cross sectional views explaining a state transition process in which the state of the sun gear S1 transits from the non-lock state to the lock state due to the locking action of the brake mechanism 700. Incidentally, in FIG. 6, portions overlapping those of FIG. 5 will carry the same reference numerals, and the explanation thereof will be omitted as occasion demands.

In FIG. 6, FIG. 6(a) shows the same state as in FIG. 5, in which there is the gap part GAP between the clutch plate 720 and the friction part 733 and in which the clutch plate 720 can rotate without an influence of a deterrent power by the friction part 733. Thus, by the action of the cam ball 750, the cam 710 and the clutch plate 720 can rotation substantially integrally. Here, the cam 710 is coupled with a rotor RT of the MG1 via the sun gear shaft 310, and the rotor RT is coupled with the sun gear S1 via the sun gear shaft 310. Therefore, in the hybrid drive apparatus 10, the cam 710 can be treated as a rotational element that rotates integrally with the sun gear S1. In other words, in the state shown in FIG. 6(a), the sun gear S1 can also rotate without restriction of the clutch plate 720. This state corresponds to one example of the "non-lock state" of the present invention.

FIG. 6(b) shows a state in which an excitation current is supplied to the electromagnet 732 of the actuator 730. In other words, in this case, an electromagnetic force generated from the electromagnet 732 acts on the clutch plate 720 via the suction part 731, and the clutch plate 720 overpowers the biasing of the return spring 740, is displaced to a contact position antithetical to the non-contact position, and is adsorbed to the suction part 731. As a result, the gap part GAP disappears. Moreover, at the same time, the friction part 733 exerts a friction force on the clutch plate 720, and this hinders the operations of the clutch plate 720 in the positive rotation direction or negative rotation direction. In other words, in this state, the operations of the clutch plate 720 are hindered by the electromagnet 732 and the friction part 733, and the clutch plate 720 comes to rest with respect to the actuator 730, i.e. the case CS.

On the other hand, in the state that the clutch plate 720 is absorbed to the suction part 731 as described above, instead of the gap part GAP that disappears, a gap part is formed between the cam ball 750 and the clutch plate 720. Therefore, if the cam 710 is influenced by the rotation of the MG1 and rotates in the positive rotation direction or negative rotation direction, only the cam 710 and the cam ball 750 are displaced in the rotation direction. Incidentally, here, the explanation will be continued under the assumption that they are displaced in the positive rotation direction. Here, the newly formed gap part is reverse-tapered as viewed in the cross section, as described above. As the cam ball 750 moves in the rotational direction, the newly formed gap part gradually decreases. Eventually, it disappears, and the cam ball 750 and the clutch plate 720 come into contact with each other.

FIG. 6(c) shows a state in which they are in contact again as described above. If the cam 710 rotates in the positive rotation direction in this state, a pressing force which presses the clutch plate 720 in the direction of the actuator 730 is further generated by the action of the reverse-tapered opposed surface. As a result, as long as a positive torque in the positive rotation direction is applied to the cam 710, even if the excitation of the electromagnet 732 is stopped, the contact state of the three does not change, and the cam 710 becomes in a so-called self-lock state due to the pressing force and the friction force given from the friction part 733.

In the self-lock state, the cam 710 also comes to rest, i.e. becomes in a fixed state, with respect to the case CS as in the clutch plate 720. As a result, the sun gear S1 which rotates integrally with the cam 710 also gets fixed to the case CS. This state is the lock state. In the lock state, the rotational speed of the sun gear S1, i.e. the MG1 rotational speed Nmg1, is zero.

1-2-2: Details of Speed Change Mode

Figure 7:
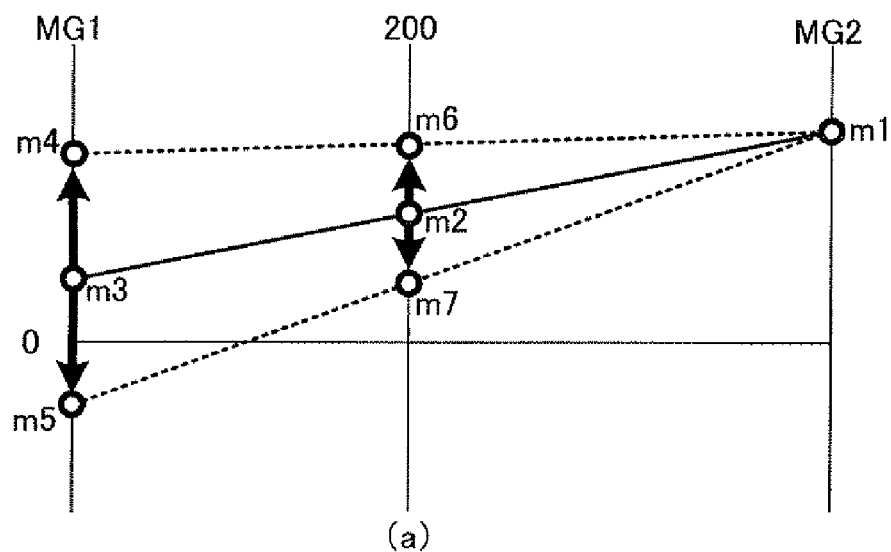
FIG. 7 are operational nomograms explaining the action of a power dividing mechanism in the hybrid drive apparatus in FIG. 2.
Figure 7:
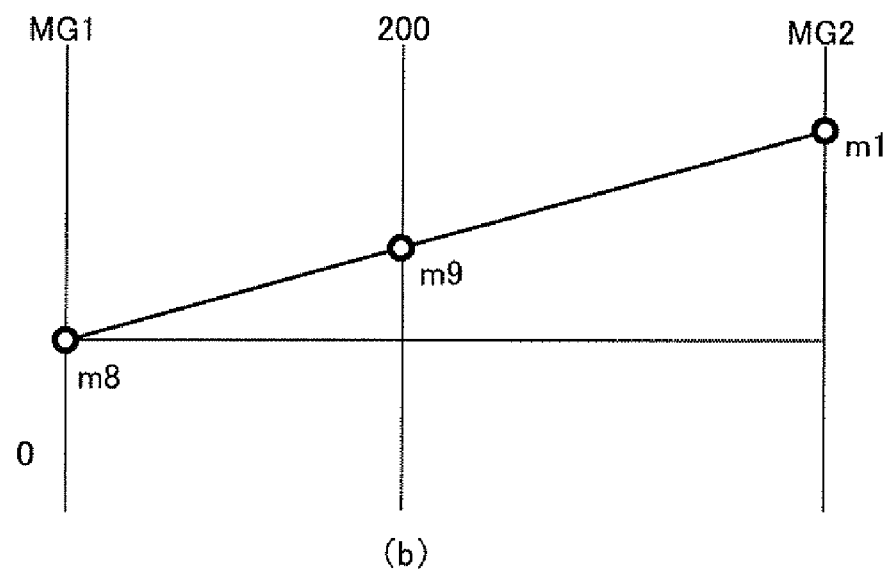

The hybrid vehicle 1 in the embodiment can select a fixed speed change mode or a stepless speed change mode as a speed change mode, in accordance with the state of the sun gear S1. Now, with reference to FIG. 7, the speed change mode of the hybrid vehicle 1 will be explained. FIG. 7 are operational nomograms of the hybrid drive apparatus 10 explaining the action of the power dividing mechanism 300. Incidentally, in FIG. 7, portions overlapping those of FIG. 2 will carry the same reference numerals, and the explanation thereof will be omitted as occasion demands.

In FIG. 7(a), the vertical axis shows the rotational speed, and the horizontal axis shows the motor generator MG1 (uniquely meaning the sun gear S1), the engine 200 (uniquely meaning the carrier C1) and the motor generator MG2 (uniquely meaning the ring gear R1) from the left in order. Here, the power dividing mechanism 300 is a planetary gear mechanism, and if the rotational speeds of two elements out of the sun gear S1, the carrier C1, and the ring gear R1 are determined, the rotational speed of the remaining one element is inevitably determined. In other words, on the operational nomogram, the operating state of each rotational element can be expressed by one operational nomogram which corresponds to one operating state of the hybrid drive apparatus 10 in a one-to-one manner. Incidentally, hereinafter, a point on the operational nomogram will be expressed by an operating point mi (i is a natural number), as occasion demands. In other words, one operating mi corresponds to one rotational speed.

In FIG. 7(a), it is assumed that the operating point of the MG2 is an operating point m1. In this case, if the operating point of the MG1 is an operating point m3, the operating point of the engine 200 coupled with the carrier C1 as the remaining one rotational element is an operating point m2. At this time, if the operating point of the MG1 is changed to an operating point m4 and an operating point m5 while the rotational speed of the drive shaft 500 is maintained, then, the operating point of the engine 200 is changed to an operating point m6 and an operating point m7, respectively.

In other words, in this case, by setting the motor generator MG1 as a rotational speed control apparatus, the engine 200 can be operated at a desired operating point. The speed change mode corresponding to this state is the stepless speed change mode. In the stepless speed change mode, the operating point of the engine 200 (the operating point in this case is defined by the combination of the engine rotational speed and the engine torque Te) is controlled to an optimal fuel economy operating point at which the fuel consumption rate of the engine 200 is basically minimized. Incidentally, it is obvious that the MG1 rotational speed Nmg1 needs to be variable in the stepless speed change mode. Thus, if the stepless speed change mode is selected, the drive state of the brake mechanism 700 is controlled such that the sun gear S1 is in the non-lock state.

Here, further to that, in the power dividing mechanism 300, in order to supply the torque Ter corresponding to the engine torque Te described above to the drive shaft 500, it is necessary to supply a reaction torque having the same magnitude as that of and having the reversed sign (i.e. negative torque) of the aforementioned torque Tes which appears on the sun gear shaft 310 in accordance with the engine torque Te, from the motor generator MG1 to the sun gear shaft 310. In this case, in the operating points in a positive rotation area such as the operating point m3 or the operating point m4, the MG1 is in a power generation state having a positive rotation negative torque. In other words, in the stepless speed change mode, by making the motor generator MG1 (uniquely meaning the sun gear S1) function as a reaction element, one portion of the engine torque Te is supplied to the drive shaft 500, and electric power is generated in one portion of the engine torque Te distributed to the sun gear shaft 310. If an engine direct torque is insufficient for use as a torque required for the drive shaft 500, the torque Tmg2 is supplied to the drive shaft 500 from the motor generator MG2, as occasion demands.

On the other hand, for example, in an operating condition in which the engine rotational speed NE is low although the MG2 rotational speed Nmg2, such as in high-speed light-load driving, the MG1 has the operating point in a negative rotation area such as the operating point m5. In this case, the motor generator MG1 outputs a negative torque as the reaction torque of the engine torque Te, and it is in a negative-rotation negative-torque state and in a power-running state. In other words, in this case, the torque Tmg1 from the motor generator MG1 is transmitted to the drive shaft 500 as the drive torque of the hybrid vehicle 1.

On the other hand, the motor generator MG2 is in a negative-torque state because it absorbs a torque which is outputted to the drive shaft 500 and which is excessive for a required torque. In this case, the motor generator MG2 is in a positive-rotation negative-torque state and in the power generation state. In this state, there is an inefficient electrical path referred to as so-called power circulation, such as using a driving force from the MG1 to generate electricity on the MG2 and power-running driving the MG1 due to the generated power. In the state that the power circulation takes place, the transmission efficiency of the hybrid drive apparatus 10 is reduced, the system efficiency of the hybrid drive apparatus 10 (e.g. defined as thermal efficiency of the engine 200× transmission efficiency, etc.) is reduced, and the fuel economy of the hybrid vehicle 1 is likely deteriorated Thus, in the hybrid vehicle 1, in an operating area set in advance such that the power circulation can take place, the sun gear S1 is controlled in the aforementioned lock state by the brake mechanism 700. The situation is shown in FIG. 7(b). When the sun gear S1 becomes in the lock state, inevitably, the motor generator MG1 also becomes in the lock state, and the operating point of the MG1 becomes an operating point m8 at which the rotational speed is zero. Thus, the operating point of the engine 200 becomes an operating point m9, and the engine rotational speed NE is uniquely determined from the MG2 rotational speed Nmg2 which uniquely means the vehicle speed V (i.e. a transmission gear ratio becomes constant). As described above, the speed change mode corresponding to the case where the MG1 is in the lock state is the fixed speed change mode.

In the fixed speed change mode, the reaction torque of the engine torque Te with which the motor generator MG1 is originally to be burdened can be replaced by the physical braking force of the brake mechanism 700. In other words, it is not necessary to control the motor generator MG1 either in the power generation state or in the power-running state, and it is possible to stop the motor generator MG1. Therefore, basically, it is no longer necessary to operate the motor generator MG2 either, and the MG2 becomes in a so-called idling state. In the end, in the fixed speed change mode, the drive torque that appears on the drive shaft 500 becomes only a direct component (refer to the equation (2)) divided to the drive shaft 500 side by the power dividing mechanism 300, out of the engine torque Te, and the hybrid drive apparatus 10 only performs mechanical power transmission. Thus, its transmission efficiency is improved.

1-2-3: Selection of Speed Change Mode

In the hybrid vehicle 1, the speed change mode is controlled to a speed change mode in which the system efficiency ηsys of the hybrid drive apparatus 10 is higher, at each time, by the ECU 100. At this time, the ECU 100 refers to a speed change map stored in the ROM in advance.

Figure 8:
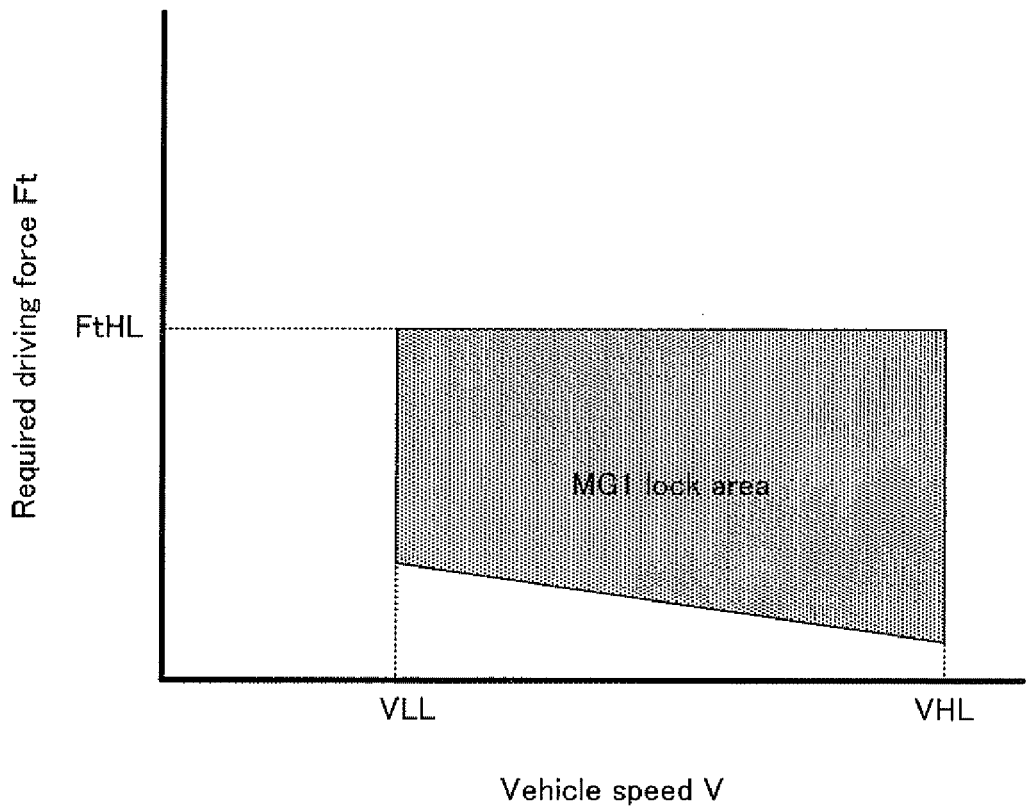
FIG. 8 is a schematic diagram showing a speed change mode map referred to when a speed change mode is selected in the hybrid vehicle in FIG. 1.

Now, with reference to FIG. 8, the speed change map will be explained. FIG. 8 is a schematic diagram showing the speed change map.

In FIG. 8, the speed change map is a two-dimensional map with a required driving force Ft shown on the vertical axis and the vehicle speed V shown on the horizontal axis. On the speed change map, an area in which the MG1 is controlled to the lock state to select the fixed speed change mode is defined as a MG1 lock area (a hatched area in FIG. 8). Incidentally the required driving force Ft is the required value of the driving force applied to each drive shaft, and it is obtained from a required driving force map in which the vehicle speed V detected by the vehicle speed sensor 13 and the accelerator opening degree Acc detected by the accelerator opening sensor 14 are used as parameters.

Here, a low speed side boundary value VLL for defining the boundary of the MG1 lock area on a low vehicle speed side is defined by the minimum rotational speed of the engine 200. In other words, in the fixed speed change mode realized by that the MG1 becomes in the lock state, the engine 200 is directly connected the drive shaft 500. Whether or not the engine 200 can perform self-sustaining rotation, the vehicle speed V can be reduced. Thus, the low speed side boundary value VLL is determined in advance so that the engine 200 does not become in an accidental fire state or in a stall state.

Incidentally, in the hybrid vehicle 1, it is also possible to select an EV driving mode in which only the power of the motor generator MG2 is used to drive the hybrid vehicle 1 (the EV driving mode is also one example of the "driving mode" of the present invention). Therefore, the low speed side boundary value VLL may be associated with a condition for selecting the EV driving mode, instead of or in addition to the operation limit on the low speed side of the engine 200 described above. In the EV driving, it is only necessary to output the motor torque to the drive shaft 500 from the motor generator MG2, and even if the engine 200 is set in an engine stop state, that does not interfere with the execution of the EV driving. Thus, after all, the EV driving can be selected independently of whether the motor generator MG1 is in the lock state or in the non-lock state.

Moreover, a high speed side boundary value VHL for defining the boundary of the MG1 lock area on a high vehicle speed side is defined by the upper-limit rotational speed (i.e. rev limit) of the engine 200. In other words, since the engine rotational speed NE of the engine 200 uniquely means the vehicle speed V, it is hardly possible to increase the vehicle speed V beyond the upper limit value of the engine rotational speed NE in the hybrid vehicle 1 in which the fixed speed change mode is selected. It is judged whether or not the vehicle speed higher than that is required, on the basis of the vehicle speed V and the accelerator opening degree Ta or Acc at that time point. If the vehicle speed higher than that is required, in the end, the required driving force Ft exceeds a high driving force side boundary value described later, and the fixed speed change mode is canceled due to a request on the driving force side.

On the other hand, a low driving force side boundary value FtLL for defining the boundary of the MG1 lock area on the low driving force side (refer to a dashed line in FIG. 8) is determined on the basis of the system efficiency of the hybrid drive apparatus 10. Since the hybrid drive apparatus 10 is provided with the MG1 and the MG2 as a power source, the engine 2000 originally adopts an engine having a combustion form in which a thermal efficiency is prioritized over maximum output in many cases. However, basically, the thermal efficiency of the engine has the best point in an area on a reasonably high revolution side and a reasonably high load side, and the thermal efficiency is extremely low on a low revolution side or a light load side in many cases. Thus, in an area in which the required driving force is low, even if the transmission efficiency is improved by using the fixed speed change mode, the reduction in thermal efficiency exceeds it, and in some cases, it is better to select the stepless speed change mode as the system efficiency of the hybrid drive apparatus 10. Therefore, the low driving force side boundary value FtLL becomes larger on a lower vehicle speed side.

On the other hand, the boundary of the MG1 lock area on a high driving force side is defined by a high driving force side boundary value FtHL. The high driving force side boundary value FtHL may be invariable or variable (invariable in FIG. 8) depending on the vehicle speed V and is a fitted value experimentally obtained in advance.

Incidentally, in the speed change map, the relation shown in FIG. 8 is quantified and stored. The ECU 100 selects one speed change mode determined in accordance with the vehicle speed V and the required driving force Ft at each time and controls each part of the hybrid drive apparatus 10 in a proper state. However, this is merely one example, and various known aspects can be adopted as a practical aspect associated with the change in the speed change mode between the fixed speed change mode and the stepless speed change mode.

1-2-4: Details of Mislocking Prevention Control

In the hybrid drive apparatus 10, it is possible to drive the hybrid vehicle 1 more efficiently by providing the fixed speed change mode as the selectable speed change mode; however, for that, as its precondition, the brake mechanism 700 needs to normally function. In other words, if the brake mechanism 700 does not adopt an operating state in which it should be, the brake mechanism 700 likely becomes a factor for deteriorating drivability. At this time, if the fixed speed change mode cannot be selected, there will be only the deterioration in the fuel economy described above or the like and there will be a relatively small influence. If the fixed speed change mode is mistakenly selected other than in an operating area to be originally selected, there will be a great influence. In other words, in this type of hybrid drive apparatus, it is necessary to prevent and desirably forestall the mislocking of the sun gear S1. In the hybrid vehicle 1 in the embodiment, the subject or problem is preferably solved by the mislocking prevention control performed by the ECU 100. Incidentally, the sun gear S1 is configured to rotate integrally with the rotor RT of the MG1 and the cam 710 via the sun gear shaft 310. The mislocking of the sun gear S1 is namely equivalent to the mislocking of the MG1 and the mislocking of the cam 710.

Figure 9:
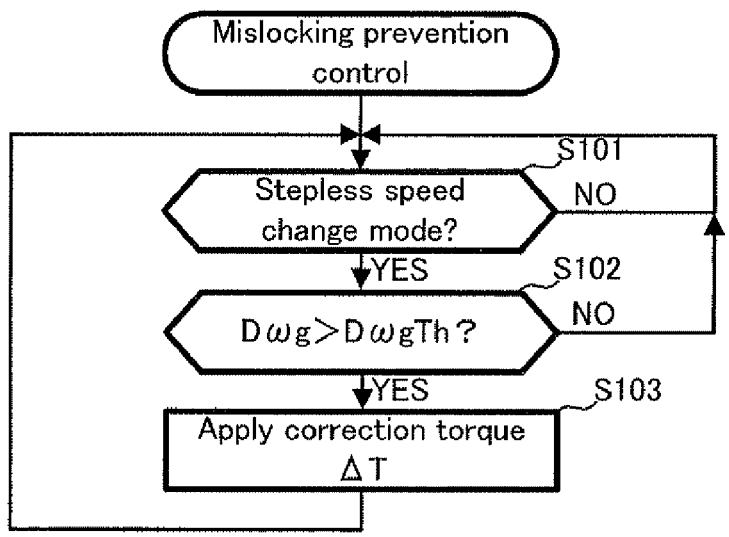
FIG. 9 is a flowchart showing mislocking prevention control performed by an ECU in the hybrid vehicle in FIG. 1.

Now, with reference to FIG. 9, the details of the mislocking prevention control will be explained. FIG. 9 is a flowchart showing the mislocking prevention control.

In FIG. 9, the ECU 100 judges whether or not the operating condition of the hybrid vehicle 1 at the current time point corresponds to the stepless speed change mode (step S101). If it corresponds to the fixed speed change mode (the step S101: NO), the ECU 100 repeatedly performs the step S101 and controls the process to be substantially in a standby state.

On the other hand, if the operating condition of the hybrid vehicle 1 corresponds to the stepless speed change mode (the step S101: YES), i.e. if the cam 710 and the clutch late 720 should originally rotate substantially integrally in the brake mechanism 700, then, the ECU 100 further performs temporal differentiation on an angular velocity $\omega g$ of the MG1 obtained by the angle conversion of the MG1 rotational speed Nmg1 and adopts its absolute value, thereby calculating MG1 angular acceleration $D\omega g$ as the absolute value of the angular acceleration of the MG1, and at the same time, the ECU 100 judges whether or not the calculated MG1 angular acceleration $D\omega g$ is greater than a criterion value $D\omega gth$ set in advance (step S102).

If the MG1 angular acceleration $D\omega g$ is less than or equal to the criterion value $D\omega gth$ (the step S102: NO), the ECU 100 returns the process to the step S101 under the judgment that the sun gear S1 is not in a mislocking state. If the MG1 angular acceleration Dωg is greater than the criterion value Dωgth (the step S102: YES), the ECU 100 controls the motor generator MG1 or the engine 200 such that a correction torque ΔT is applied to the sun gear S1, under the judgment that the sun gear S1 is in the mislocking state (step S103). If the step S103 is performed, the process is returned to the step S103, and a series of the process operations is repeated. The mislocking prevention control is performed as described above.

Now, with reference to FIG. 6 again, the mislocking of the sun gear S1 in the embodiment will be explained.

Originally, in the stepless speed change mode, the operating state of the brake mechanism 700 is a state corresponding to FIG. 6(a), and macroscopically, the clutch plate 720 rotates substantially integrally with the cam 710 without receiving any friction force from the friction part 733. However, microscopically, the friction force generated between the friction part 733 and the clutch plate 720 is not necessarily zero, and a friction force referred to as so-called "drag friction" is generated in some cases. The drag friction is associated with the angular acceleration of an engagement target (since the suction part 731 stands still with respect to the case CS, it indicates herein the angular acceleration of the clutch plate 720, and it uniquely indicates the angular acceleration of the cam 710, the sun gear S1, and the motor generator MG1). As the absolute value of the angular acceleration increases, the drag friction also increases.

Therefore, if the MG1 angular acceleration Dωg is excessively high (i.e. if the rotational speed of the cam 710 suddenly changes to a rotation-increasing side or rotation-reducing side), then, in the clutch plate 720, the substantially integral rotational state with the cam 710 collapses due to the drag friction, thereby causing a rotational deviation between the two. The rotational deviation between the two causes the cam ball 750 to press the clutch plate 720 to the actuator 730 side together with the rotation of the cam 710, and the brake mechanism 700 eventually moves into the self-lock state shown in FIG. 6(c). In other words, although they are originally not under the condition that they are to be locked, the cam 710, the sun gear S1 and the Mg1 are mistakenly locked by the brake mechanism 700. The mislocking can occur without presence of any foreign object in the gap part GAP; however, if various dust, particulate matters, etc. generated with time in accordance with the operations of the brake mechanism 700 are attached to the gap part GAP, the mislocking tends to occur more easily. The aforementioned criterion value Dωgth is a fixed or variable value set as a value in which the possibility of the occurrence of this type of mislocking can be high to a hardly ignorable extent in practice, on the basis of experiments, experiences, theories, or simulations, etc. in advance. Incidentally, the "mislocking state" in which the presence thereof is judged in the embodiment is not necessarily related to whether or not the mislocking of the sun gear S1 actually occurs, as described above, and it is merely a state from a preventive viewpoint in which the mislocking may occur.

Figure 10:
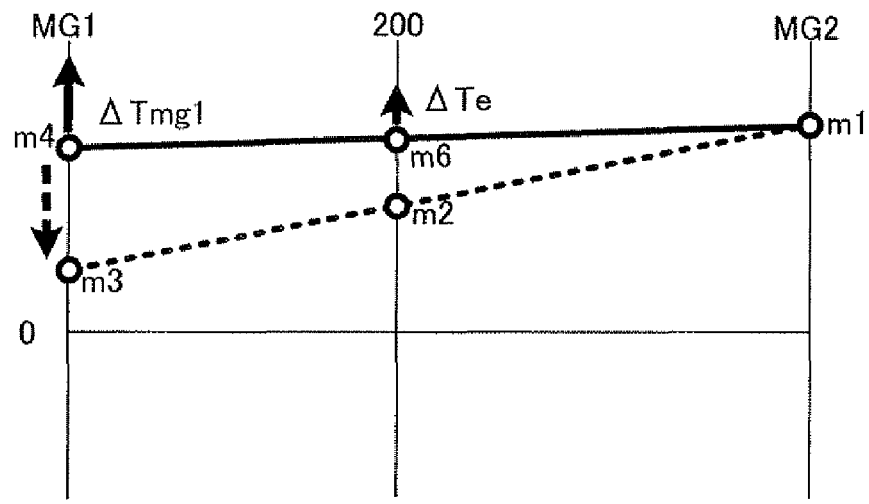
FIG. 10 is an operational nomogram explaining the concept of a correction torque in the mislocking prevention control in FIG. 9.

Next, with reference to FIG. 10, the correction torque ΔT will be explained. FIG. 10 is an operational nomogram of the power dividing mechanism 300 explaining the concept of the correction torque ΔT. Incidentally, in FIG. 10, portions overlapping those of FIG. 7 will carry the same reference numerals, and the explanation thereof will be omitted as occasion demands.

In FIG. 10, it is assumed that if a relatively large negative torque is applied to the sun gear S1 to change the rotational speed of the sun gear S1 from a rotational speed corresponding to the operating point m4 to a rotational speed corresponding to the operating point m3 in a short time (refer to a dashed line), the angular acceleration on a deceleration side increases and the MG1 angular acceleration Dωg exceeds the criterion value Dωgth.

Here, as is clear from FIG. 10, in order to forestall the mislocking of the sun gear S1 caused by the MG1 angular acceleration Dωg, it is only necessary to apply a positive torque to the sun gear shaft 310. Therefore, in the aforementioned step S103, the ECU 100 controls the PCU 11 such that a positive correction torque ΔTmg1 is applied from the motor generator MG1 as the correction torque ΔT. As a result, one portion of a negative torque which causes high angular acceleration on the deceleration side is canceled by the correction torque ΔTmg1, and the rate of a reduction in the rotational speed of the MG1 becomes slow, and the drag friction generated between the clutch plate 720 and the friction part 733 causes differential rotation between the clutch plate 720 and the cam 710. Thus, it is forestalled that the sun gear S1 is mistakenly locked. Incidentally, according to a differential action between the rotational elements in the power dividing mechanism 300, as described above, since one portion of the engine torque Te appears on the sun gear shaft 310, the correction torque ΔT may be a positive correction torque ΔTe applied from the engine 200.

Incidentally, due to the application of the correction torque ΔT, the torque acting in the direction of promoting the mislocking is reduced to some extent. Thus, a range that the value of the correction torque ΔT can adopt may be relatively wide. However, the MG1 angular acceleration Dωg increases in transitional driving in many cases. Thus, it is more preferable that the correction torque ΔT is applied such that the mislocking of the sun gear S1 is prevented certainly in a range in which there is no reduction in a power performance. In view of that, the correction torque ΔT may be set as a value corresponding to the MG1 angular acceleration Dωg, for example by multiplying the MG1 angular acceleration Dωg by a correction factor k set in advance, or the like.

Incidentally, the mislocking of the sun gear S1 does not necessarily occur as soon as the MG1 angular acceleration Dωg exceeds the criterion value Dωgth; however, considering that the correction torque ΔT is desirably applied before the mislocking occurs, in the criterion value Dωgth, a margin may be added slightly to a safe side.

Second Embodiment

Figure 11:
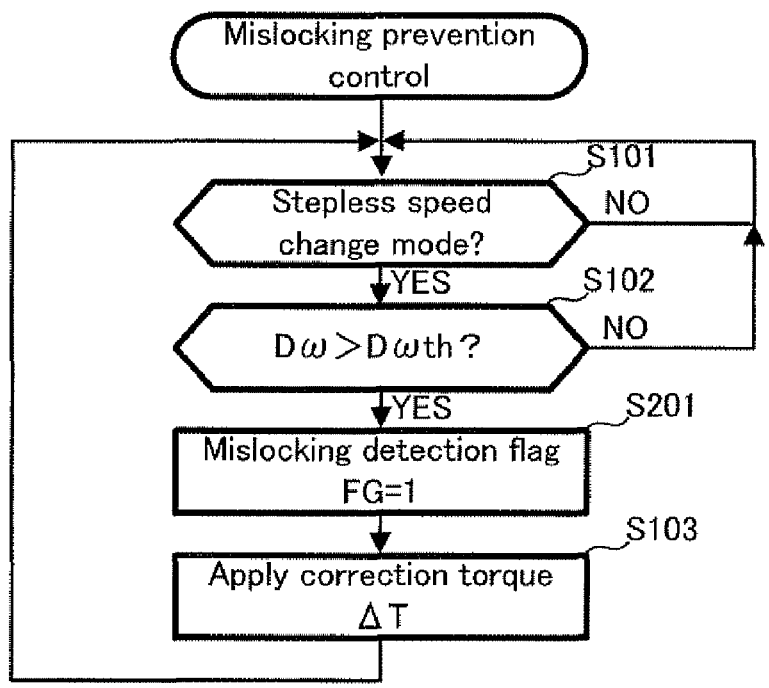
FIG. 11 is a flowchart showing mislocking prevention control in a second embodiment of the present invention.

Next, with reference to FIG. 11, as a second embodiment of the present invention, an explanation will be given on mislocking prevention control which is different from the first embodiment. FIG. 11 is a flowchart showing the mislocking prevention control in the second embodiment. Incidentally, in FIG. 11, portions overlapping those of FIG. 9 will carry the same reference numerals, and the explanation thereof will be omitted as occasion demands. Incidentally, it is assumed that a system configuration in the second embodiment is equivalent to that of the hybrid vehicle 1 in the first embodiment.

In FIG. 11, if the MG1 angular acceleration Dωg is greater than the criterion value Dωgth (the step S102: YES), the ECU 100 sets "1" indicating that the mislocking is detected, to a mislocking detection flag FG (step S201), and then applies the correction torque ΔT (the step S103). In other words, in the embodiment, it is saved as a detection history that the sun gear S1 is in the mislocking state (the mislocking as an actual phenomenon does not necessarily occur). Thus, it is possible to take measures such as, for example, storing the number of the detection times of the mislocking in a memory inside or outside the ECU 100 and making use of it in maintenance, performing lightning control on a warning light and an indicator disposed on a dashboard and a console panel, or displaying that the mislocking is detected as occasion demands on an information displaying apparatus such as a Multi Information Display (MID) disposed in a meter hood. By informing a driver of an operating aspect in which the mislocking tends to occur, it is possible to promote the prevention of the subsequent mislocking.

Third Embodiment

Figure 12:
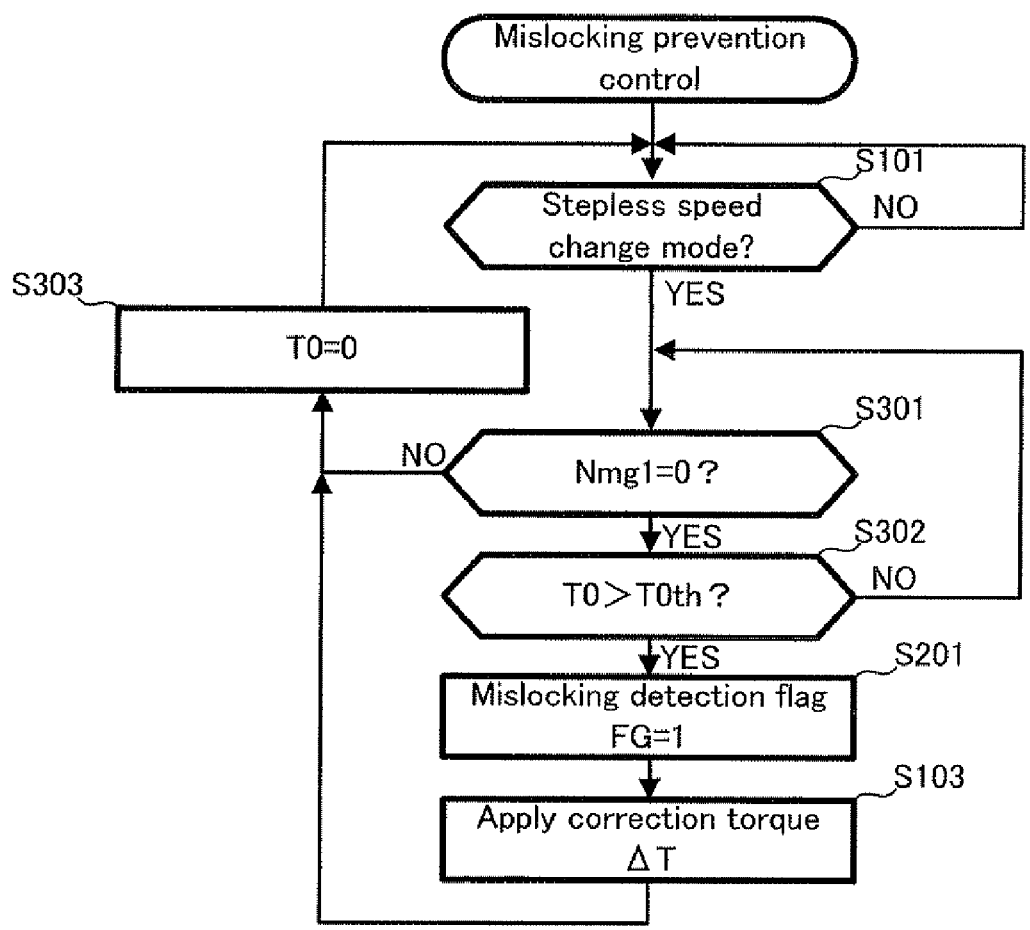
FIG. 12 is a flowchart showing mislocking prevention control in a third embodiment of the present invention.

Next, with reference to FIG. 12, as a third embodiment of the present invention, an explanation will be given on yet another mislocking prevention control. FIG. 12 is a flowchart showing the mislocking prevention control in the third embodiment. Incidentally, in FIG. 12, portions overlapping those of FIG. 9 and FIG. 11 will carry the same reference numerals, and the explanation thereof will be omitted as occasion demands. Incidentally, it is assumed that a system configuration in the third embodiment is equivalent to that of the hybrid vehicle 1 in the first embodiment.

In FIG. 12, the ECU 100 judges whether or not the MG1 rotational speed Nmg1 is zero in the operating condition corresponding to the stepless speed change mode (step S301). If the MG1 rotational speed Nmg1 is not zero (the step S301: NO), the ECU 100 resets an elapsed time T0 described later to zero which is the initial value (step S303) and returns the process to the step S101.

On the other hand, if the MG1 rotational speed Nmg1 is zero (the step S301: YES), the ECU 100 judges whether or not the elapsed time T0 exceeds a criterion value T0*th* (step S302). Here, the elapsed time T0 is a time continuously counted, starting from a time at which it is firstly detected that the MG1 rotational speed Nmg1 is zero, a reference time point. If the elapsed time T0 is less than or equal to the criterion value T0*th* (the step S302: NO), the ECU 100 returns the process to the step S301. In other words, until the MG1 rotational speed Nmg1 is no longer zero or until the elapsed time T0 exceeds the criterion value T0*th*, the step S301 and the step S302 are repeatedly performed.

After this process, if the elapsed time T0 indicating the length of a period in which the MG1 rotational speed Nmg1 is zero exceeds the criterion value T0*th* (the step S302: YES), the ECU 100 performs the step S201 and the step S103 as in the second embodiment and resets the elapsed time T0 (step S303) and then repeats a series of the process operations from the step S101. The mislocking prevention control in the third embodiment is performed as described above.

According to the embodiment, as opposed to the first and second embodiments, it is judged whether or not the mislocking of the sung gear S1 occurs on the basis of not the angular acceleration of the motor generator MG1 but the rotational speed Nmg1. Even in the stepless speed change mode, of course, the MG1 rotational speed Nmg1 can be zero. Since the sun gear S1 functions as the reaction element in the stepless speed change mode, if the sun gear S1 is in a normal state in which it is not locked, the MG1 rotational speed Nmg1 originally should be accompanied by a minute change. Therefore, if the state that the MG1 rotational speed Nmg1 is zero continues for a reasonably long time, it is possible to judge that the sun gear S1 is mistakenly locked.

Incidentally, in view of such a detection principle, the "mislocking state" in the embodiment is namely a state in which the mislocking has already occurs as an actual phenomenon. Therefore, the positive correction torque ΔT applied in the step S103 is a negative torque if the motor generator MG1 is mistakenly locked in the positive rotation area and a positive torque if it is mistakenly locked in the negative rotation area. Incidentally, at this time, since the engine torque Te does not adopt the negative torque, if the MG1 is mistakenly locked in the positive rotation area, the correction torque ΔTmg1 is supplied from the MG1.

Fourth Embodiment

Figure 13:
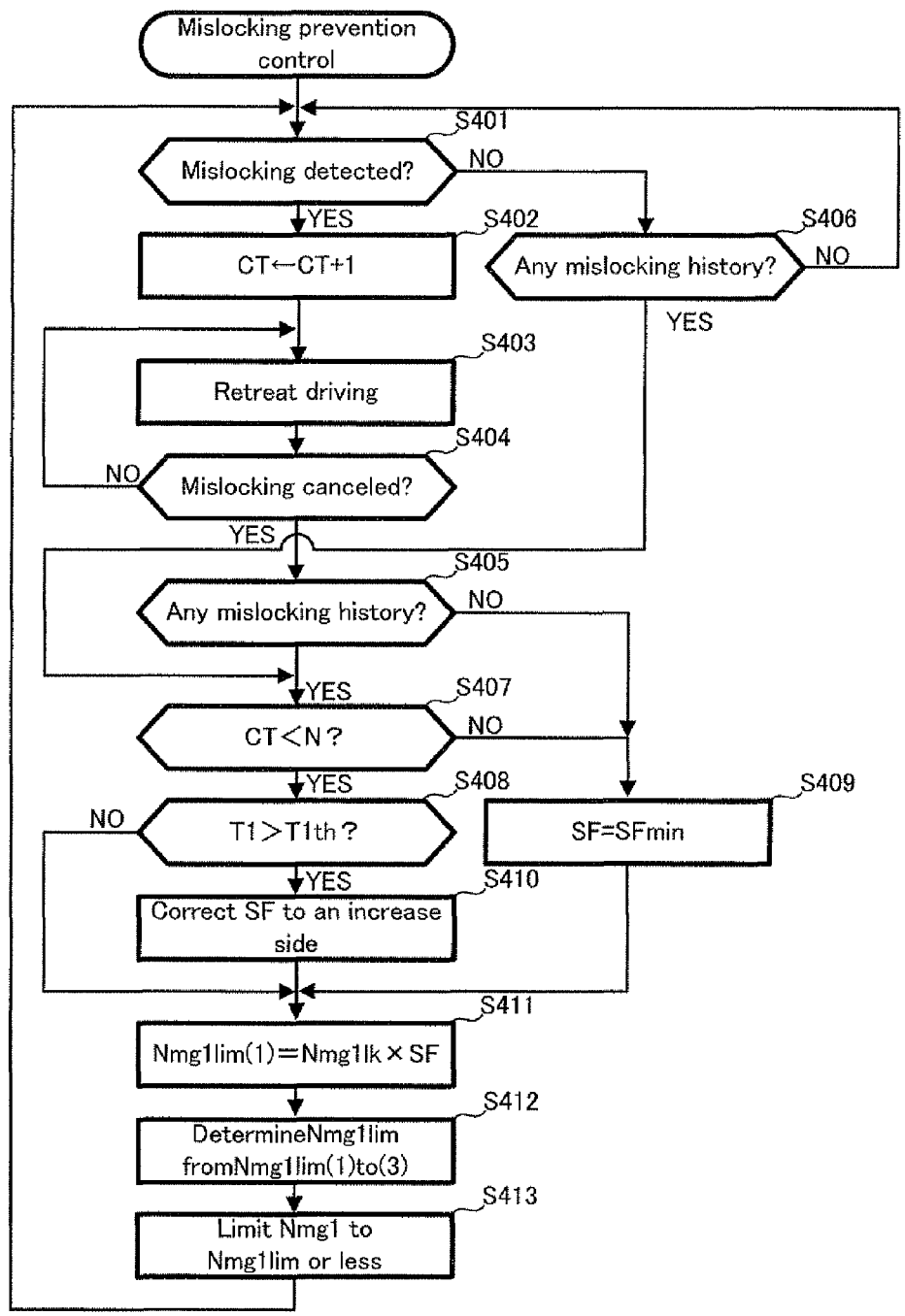
FIG. 13 is a flowchart showing mislocking prevention control in a fourth embodiment of the present invention.

Next, with reference to FIG. 13, as a fourth embodiment of the present invention, yet another mislocking prevention control will be explained. FIG. 13 is a flowchart showing the mislocking prevention control in the fourth embodiment. Incidentally, it is assumed that a system configuration in the fourth embodiment is equivalent to that of the hybrid vehicle 1 in the first embodiment.

In FIG. 13, the ECU 100 judges whether or not the mislocking of the sun gear S1 is detected, for example by applying the various detection methods in the first to third embodiments described above or by applying another detection method (step S401). If the mislocking is detected (the step S401: YES), the ECU 100 increments by "1" a counter CT for indicating the number of the detection times of the mislocking of the sun gear S1 in the past (step S402) and performs predetermined retreat driving control (step S403). Incidentally, the counter CT is stored in a rewritable memory in which deletion is not performed even at an ignition off time.

On the other hand, if the mislocking is not detected (the step S401: NO), the ECU 100 judges whether or not the mislocking occurred in the past with reference to the counter CT (step S406). If the mislocking did not occur in the past (the step S406: NO), i.e. if the mislocking of the sun gear S1 has not detected even once since the factory shipment of the hybrid vehicle 1, the ECU 100 returns the process to the step to the step S401 and repeats a series of the process operations. Moreover, if the mislocking occurred in the past (the step S406: YES), the process is moved to a step S407 described later.

The retreat driving in the embodiment indicates that the hybrid vehicle 1 is driven in a range that the direct torque Ter from the engine 200 can cover (if the SOC of the battery 12 is sufficient, assisting may be performed by using the motor torque Tmg2 from the MG2 as occasion demands). Moreover, during the retreat driving, the ECU 100 applies the correction torque ΔT in the direction of canceling the mislocking as described in the third embodiment or performs similar actions, thereby cancelling the mislocking that occurs.

If the retreat driving control is started, the ECU 100 judges whether or not the mislocking is canceled (step S404). It is judged whether or not the mislocking is canceled, by controlling an increase or decrease in the rotational speed of the MG1 in a preset range. If the mislocking is not canceled (the step S404: NO), the ECU 100 returns the process to the step S403 and continues the retreat driving control. If the mislocking is canceled (the step S404: YES), the ECU 100 judges whether or not the mislocking occurred in the past with reference to the counter CT as in the step S406 (step S405).

If the mislocking did not occur in the past (the step S405: NO), i.e. if the mislocking is detected this time for the first time, the ECU 100 sets a safety factor SF described later to a minimum value SFmin (e.g. 0.3) (step S409). On the other hand, if the mislocking occurred in the past (the step S405: YES), the ECU 100 judges whether or not the number of the times of the mislocking that occurred in the past is less than N with reference to the counter CT (step S407). Incidentally, N is, for example, a value of about 5 to 10.

If the number of the times of the mislocking that occurred in the past is greater than or equal to N (the step S407: NO), the ECU 100 moves the process to the step S409 and sets the safety factory SF to the aforementioned minimum value SFmin. On the other hand, if the number of the times of the mislocking that occurred in the past is less than N (the step S407: YES), the ECU 100 judges whether or not an elapsed time T1 from when the safety factor SF is set to one value exceeds a criterion value T1*th* (step S408). The criterion value T1*th* is a fitted value, and it may be also set from a time range of, for example, several minutes to several ten minutes.

If the elapsed time T1 exceeds the criterion value T1*th* (the step S408: YES), i.e. if the number of the detection times of the mislocking in the past is less than N and if it has elapsed a longer time than T1*th* since the closest mislocking detection time point, the ECU 100 corrects the safety factor SF set at the current time point to an increase side (step S410). In the step S410, the safety factor SF is increased by 0.1, with its upper limit as 0.9.

If the safety factor SF is corrected to the increase side, or if the safety factory is set to the minimum value SFmin in the step S409, or if the elapsed time T1 is less than or equal to the criterion value nth (the step S408: NO), the ECU 100 calculates a candidate value Nmg1*lim*(1) of a limit rotational speed Nmg1*lim* of the motor generator MG1 on the basis of the set safety factor SF (step S411). Incidentally, in the step S411, the candidate value Nmg1*lim*(1) is calculated by multiplying a MG1 rotational speed Nmg1*lk* at the closest mislocking detection time by the safety factor SF. Then, the ECU 100 determines the final limit rotational speed Nmg1*lim* from among the calculated candidate value Nmg1*lim*(1) and other candidate values Nmg1*lim*(2) and Nmg1*lim*(3) (step S412).

Here, the candidate value Nmg1*lim*(2) is a value set from the viewpoint of protecting the parts of the hybrid drive apparatus 10. Due to the influence of the aforementioned drag friction, the foreign body and dust which enter in the gap part GAP, or the like, basically, the mislocking of the sun gear S1 tends to occur as the MG1 rotational speed Nmg1 is higher. Thus, when the mislocking occurs, an inertia torque according to the MG1 rotational speed Nmg1 at that time point is applied to the sun gear shaft 310 or each part of the brake mechanism 700 or the like in a relatively short time.

Thus, in the hybrid vehicle 1, the MG1 rotational speed Nmg1 in the mislocking which can withstand the inertia torque on the occurrence of the mislocking associated with each part is determined on the basis of experiments, experiences, theories, simulations of the like in advance. The candidate value Nmg1(2) of the limit rotational speed is set as a value obtained by further multiplying the MG1 rotational speed Nmg1 set in view of the durability of this part by a safety factor of 1 or less (different from the aforementioned safety factor SF). Incidentally, the relevant safety factor may be stored in a map as occasion demands as a variable value considering the years of use and mileage of the hybrid vehicle 1.

Moreover, the candidate value Nmg1*lim*(3) is determined in view of the drivability of the hybrid vehicle 1. If the mislocking occurs in the sun gear S1, the reaction torque associated with a forcible stop of the rotation of the MG1 is applied to the drive shaft 500 in a relatively short time. Thus, the drive torque that appears on the drive shaft 500 is greater than a torque required by the driver in some cases. Therefore, in the hybrid vehicle 1, the candidate value Nmg1*lim*(3) of the limit rotational speed is set not to make the driver feel uncomfortable on the basis of the experiments, experiences, theories, simulations or the like in advance.

Incidentally, since it is a value influenced by the sensibility of the driver, the candidate value Nmg1*lim*(3) may be corrected as occasion demands in view of the coolant temperature, engine rotational speed NE and engine torque Te, etc. of the engine 200 which can define the magnitude of the reaction torque that appears on the drive shaft 500, and the driving condition and environmental condition of the hybrid vehicle 1 which can influence the sensitivity of the driver. At this time, the correction factor which can be used for the correction may be stored in a proper map, or the candidate value Nmg1*lim*(3) may be mapped with the various conditions as parameters.

The ECU 100 determines the minimum value of the candidate values Nmg1*lim*(1) to (3) of the limit rotational speed as the final limit rotational speed Nmg1*lim* in the step S412. If the final limit rotational speed Nmg1*lim* is determined, the ECU 100 limits the subsequent MG1 rotational speed Nmg1 to this limit rotational speed Nmg1*lim* or less (step S413). If the step S413 is performed, the process is returned to the step S401 and a series of the process operations is repeated.

As explained above, according to the mislocking prevention control in the fourth embodiment, if the ECU 100 functions as each of the "limiting device" and the "setting device" of the present invention and if the mislocking of the sun gear S1 occurs, after that, the rotation of the MG1 is allowed only in a rotation area in which the MG1 rotational speed is less than the MG1 rotational speed when the mislocking occurs. Thus, it is possible to preferably prevent the recurrence of the mislocking. Moreover, by adopting the configuration that the safety factor SF can be updated as occasion demands, if the mislocking does not occur for a relatively long time, the rotation of the MG1 is allowed gradually. Thus, it is possible to maintain the system efficiency of the hybrid vehicle 1 as high as possible.

Moreover, in the embodiment, the limit rotational speed Nmg1*lim* is selected from a plurality of candidate values including not only the value obtained by multiplying the MG1 rotational speed Nmg1*lk* when the mislocking occurs by the safety factor SF but also a candidate value set from the viewpoint of protecting the parts of the hybrid drive apparatus 10 and preventing the deterioration in the drivability. Thus, it is possible to preferably avoid various troubles of concern due to the mislocking of the sun gear S1, and it is practically useful. Incidentally, at this time, since the final limit rotational speed Nmg1*lim* is set as the minimum value of them, it is set in a range of less than the MG1 rotational speed Nmg1*lk* when the mislocking occurs, and the effect associated with the prevention of the recurrence is ensured.

Incidentally, in the aforementioned first to fourth embodiments, the hybrid vehicle 1 is provided with the brake mechanism 700 as a cam-lock apparatus, as one example of the "locking device" of the present invention; however, as the "locking device" of the present invention, it is possible to apply not only the self-lock type engaging apparatus but also various apparatuses such as a hydraulic engaging apparatus like a wet multiplate brake, etc. or a rotational synchronization meshing apparatus like an electromagnetic dog clutch, etc. In any case, as long as it can adopt the configuration that the rotation of the lock-target rotational element (which is the cam 710 and the sun gear S1 throughout the aforementioned embodiments) is stopped with respect to the fixed member, it is possible to judge whether or not it is in the mislocking state on the basis of its rotational state.

Fifth Embodiment

In the aforementioned first to fourth embodiments, when the hybrid drive apparatus 10 adopts the fixed speed change mode, the MG1 is locked throughout (accurately, the MG1 is locked via the sun gear S1 and the cam 710). However, the structure of the hybrid drive apparatus 10 in obtaining the fixed speed change mode is not limited to this type of MG1 locking. Now, with reference to FIG. 14, another structure of the hybrid drive apparatus will be explained. FIG. 14 is a schematic configuration diagram conceptually showing the structure of a hybrid drive apparatus 20 in a fifth embodiment of the present invention. Incidentally, in FIG. 14, portions overlapping those of FIG. 2 will carry the same reference numerals, and the explanation thereof will be omitted as occasion demands.

In FIG. 14, the hybrid drive apparatus 20 has a different structure from that of the hybrid drive apparatus 10 in that it is provided with a power dividing mechanism 800 instead of the power dividing mechanism 300. The power dividing mechanism 800 adopts a form of a so-called Ravigneaux-type planetary gear mechanism, provided with a first planetary gear mechanism 810 of a single pinion gear type and a second planetary gear mechanism 820 of a double pinion type, as a differential mechanism made of a plurality of rotational elements.

The first planetary gear mechanism 810 is provided with: a sun gear 331; a carrier 812; a ring gear 813; and a pinion gear 814 engaging with the sun gear 811 and the ring gear 813, which is held by the carrier 812 so as to rotate on its axis in the axial direction and to revolve due to the rotation of the carrier 812. The rotor of the motor generator MG1 is coupled with the sun gear 811, the input shaft 400 is coupled with the carrier 812, and the drive shaft 500 is coupled with the ring gear 813.

The second planetary gear mechanism 820 is provided with: a sun gear 821; a carrier 822; a ring gear 823; and a pinion gear 824 engaging with the ring gear 823 and a pinion gear 825 engaging with the sun gear 821, each of which is held by the carrier 822 so as to rotate on its axis in the axial direction and to revolve due to the rotation of the carrier 822. The cam 710 (not illustrated) of the brake mechanism 700 is coupled with the sun gear 821. In other words, in the embodiment, the sun gear 821 functions as another example of the "one rotational element" of the present invention.

As described above, the power dividing mechanism 800 is provided with four rotational elements in total, which are on the whole a first rotational element group composed of the sun gear 811 of the first planetary gear mechanism 810, the sun gear 821 (lock-target rotational element) of the second planetary gear mechanism 820, the carrier 812 of the first planetary gear mechanism 810 and the ring gear 823 of the second planetary mechanism 820 which are coupled with each other, and a second rotational element group composed of the ring gear 813 of the first planetary gear mechanism 810 and the carrier 822 of the second planetary gear mechanism 820 which are coupled with each other.

According to the hybrid drive apparatus 20, if the sun gear 821 becomes in the lock state and its rotational speed becomes zero, then, the second rotational element group having a rotational speed uniquely meaning the vehicle speed V and the sun gear 821 define the rotational speed of the first rotational element group as the remaining one rotational element. The carrier 812 which constitutes the first rotational element group is coupled with the input shaft 400 coupled with the crankshaft 205 of the engine 200 (not illustrated). Thus, in the end, the engine rotational speed NE of the engine 200 has a unique relation with the vehicle speed V, and the fixed speed change mode is realized.

Incidentally, in the fixed speed change mode, the rotational speed of the sun gear 811 is also uniquely determined by the rotational speeds of the first and second rotational element groups. However, in the hybrid drive apparatus 20, the reaction element in the fixed speed change mode is the sun gear 821. Thus, the MG1 merely runs idle at a proper rotational speed. Therefore, when the mislocking occurs in the sun gear 821, the mislocking is preferably canceled by controlling an increase or decrease in the engine torque Te. As described above, the fixed speed change mode can be realized in the structure other than the hybrid drive apparatus 10. With that, the lock target of the brake mechanism 700 may be changed as occasion demands. In any case, the mislocking preventing apparatus of the present invention can preferably detect that the lock-target rotational element is in the mislocking state.

Incidentally, in the aforementioned various embodiments, the hybrid drive apparatus is provided with the two motor generators of the motor generator MG1 and the motor generator MG2. However, the mislocking preventing apparatus of the present invention can be also applied in the same manner, for example to a one-motor hybrid system which does not have the motor generator MG2, as its practical aspect.

The present invention is not limited to the aforementioned embodiments, but various changes may be made, if desired, without departing from the essence or spirit of the invention which can be read from the claims and the entire specification. A mislocking preventing apparatus, which involves such changes, is also intended to be within the technical scope of the present invention.

INDUSTRIAL APPLICABILITY

The present invention can be applied to an apparatus for preventing the mislocking of a rotational element in a hybrid vehicle which adopts a fixed speed change mode and a stepless speed change mode as a speed change mode, due to the locking of the rotational element.

The invention claimed is:

1. A mislocking preventing apparatus for preventing mislocking of one rotational element in a hybrid vehicle,
the hybrid vehicle comprising:
an internal combustion engine;
a rotating electrical machine;
a power dividing mechanism, which comprises a plurality of rotational elements capable of mutually differentially rotating and including rotational elements each of which is coupled with an output shaft of the internal combustion engine, an output shaft of the rotating electrical machine, and a drive shaft coupled with an axle, and which can supply at least one portion of power of the internal combustion engine to the drive shaft; and
a locking device capable of changing a state of one rotational element of the plurality of rotational elements between a non-lock state in which the one rotational element is released from a fixed member and can rotate and a lock state in which the one rotational element is fixed to the fixed member and cannot rotate,
the hybrid vehicle being configured to select between a stepless speed change mode, which corresponds to the non-lock state and in which a transmission gear ratio as a ratio between a rotational speed of the output shaft of the internal combustion engine and a rotational speed of the drive shaft is continuously variable, and a fixed speed change mode, which corresponds to the lock state in which the transmission gear ratio is fixed,
said mislocking preventing apparatus comprising:
a specifying device for specifying a rotational state of the one rotational element; and a controlling device for controlling the internal combustion engine or the rotating electrical machine to reduce a torque acting in a direction of promoting the mislocking in the one rotational element or to apply a torque in a direction opposite to the direction of promoting the mislocking on the basis of the specified rotational state.

2. The mislocking preventing apparatus according to claim 1, wherein said specifying device specifies angular acceleration of the one rotational element as the rotational state of the one rotational element, and said controlling device controls the internal combustion engine or the rotating electrical machine if the specified angular acceleration is greater than or equal to a predetermined value.

3. The mislocking preventing apparatus according to claim 1, wherein said specifying device specifies a rotational speed of the one rotational element as the rotational state of the one rotational element, and said controlling device controls the internal combustion engine or the rotating electrical machine if a state in which the specified rotational speed is zero continues for a predetermined time in a situation in which the stepless speed change mode is to be selected.

4. The mislocking preventing apparatus according to claim 1, wherein the locking device comprises:

a friction part at rest with respect to the fixed member;

a cam which can rotate integrally with the one rotational element;

a clutch plate which can move between a contact position at which the clutch plate is in contact with the friction part and a non-contact position at which the clutch plate is not in contact with the friction part;

an actuator which can apply to the clutch plate a driving force that draws the clutch plate to the contact position; and a mediate member laid between the cam and the clutch plate, and the locking device is a cam-lock apparatus in which the cam, the mediate member and the clutch plate can integrally rotate if the clutch plate is at the non-contact state and in which a pressing force for pressing the clutch plate in a direction of the friction part is supplied from the mediate member to the clutch plate if the clutch plate is at the contact position and a torque is applied to the cam in a predetermined direction.

5. The mislocking preventing apparatus according to claim 4, further comprising a limiting device for limiting a rotational speed of the rotating electrical machine to an upper-limit rotational speed or less if it is judged that the one rotational element is in the mislocking state, wherein the upper-limit rotational speed is set in a range of less than a rotational speed corresponding to the mislocking that occurred in the past.

6. The mislocking preventing apparatus according to claim 5, further comprising a setting device for setting the upper-limit rotational speed on the basis of at least one of an elapsed time from a reference time, and a driving condition and an environmental condition.

7. The mislocking preventing apparatus according to claim 1, wherein the hybrid vehicle further comprises another rotating electrical machine which is different from the rotating electrical machine coupled with the drive shaft.

\* \* \* \* \*